(12) United States Patent
Zhang et al.

(10) Patent No.: US 12,469,294 B2
(45) Date of Patent: Nov. 11, 2025

(54) COMPUTER VISION-BASED SYSTEM FOR CONTROLLING A GARAGE DOOR

(71) Applicant: Wyze Labs, Inc., Kirkland, WA (US)

(72) Inventors: Chao Zhang, Kenmore, WA (US); Zhongwei Cheng, Redmond, WA (US); J Steven Skeoch, Palos Verdes Estates, CA (US); Lin Chen, Seattle, WA (US); Hongfei Ning, Bothell, WA (US)

( * ) Notice: Subject to any disclaimer, the term of this patent is extended or adjusted under 35 U.S.C. 154(b) by 418 days.

(21) Appl. No.: 17/512,412

(22) Filed: Oct. 27, 2021

(65) Prior Publication Data

US 2023/0129198 A1 Apr. 27, 2023

(51) Int. Cl.
*G06K 7/14* (2006.01)
*E05F 15/668* (2015.01)
*E05F 15/73* (2015.01)
*G06N 20/00* (2019.01)
*G06V 20/52* (2022.01)

(52) U.S. Cl.
CPC ............ *G06V 20/52* (2022.01); *E05F 15/668* (2015.01); *E05F 15/73* (2015.01); *G06K 7/1417* (2013.01); *G06K 7/1443* (2013.01); *G06N 20/00* (2019.01); *E05F 2015/767* (2015.01); *E05Y 2900/106* (2013.01); *G06V 2201/08* (2022.01)

(58) Field of Classification Search
CPC .. G06V 20/52; G06V 2201/08; G06V 10/143; G06V 10/40; G06V 10/764; G06V 10/774; G06V 10/225; G06N 20/00; E05F 15/668; E05F 15/73; E05F 15/77; E05F 2015/767; G06K 7/1417; G06K 7/1443; E05Y 2900/106; E05Y 2400/42
See application file for complete search history.

(56) References Cited

U.S. PATENT DOCUMENTS

| | | | |
|---|---|---|---|
| 11,840,253 B1 * | 12/2023 | Pertsel | G06N 3/0464 |
| 2016/0258202 A1 * | 9/2016 | Scalisi | G07C 9/00857 |
| 2018/0122225 A1 * | 5/2018 | Geerlings | H04W 4/02 |
| 2019/0238355 A1 * | 8/2019 | Marcinkowski | G08B 13/08 |
| 2019/0325681 A1 * | 10/2019 | Bresson | G05B 13/024 |
| 2020/0208461 A1 * | 7/2020 | Virgin | E05F 15/71 |
| 2021/0209881 A1 * | 7/2021 | Lemberger | G07C 9/00896 |
| 2021/0233385 A1 * | 7/2021 | Lovejoy | G08B 7/06 |
| 2022/0019810 A1 * | 1/2022 | Farber | H04N 7/18 |

* cited by examiner

*Primary Examiner* — Kathleen M Broughton
(74) *Attorney, Agent, or Firm* — Davis Wright Tremaine LLP; Heather M. Colburn

(57) ABSTRACT

A method performed by an image capture device. The method includes determining whether to send a notification or determining whether to open a door based at least in part on at least one image captured by the image capture device.

17 Claims, 11 Drawing Sheets

COMPUTER VISION-BASED SYSTEM FOR CONTROLLING A GARAGE DOOR

BACKGROUND

Technical Field

The present invention is directed generally to systems for opening and/or closing a door, and more particularly, to systems that open and close garage doors.

Description of the Related Art

Modern garage doors are typically opened and closed by a garage door motor that is connected to a garage door controller. The garage door controller controls the operation of a garage door motor, instructing the garage door motor to open and close the garage door. Generally, a garage door opener instructs a garage door controller to cause the garage door motor to open and/or close the garage door. The garage door opener may be connected to the garage door controller via a wired connection and/or a wireless connection. The wireless connection may use radiofrequency ("RF") signals to communicate instructions from the garage door opener to the garage door controller. Some garage door controllers may be connected to the Internet and may receive an instruction from a user over the Internet to cause the garage door motor to open and/or close the garage door remotely.

An important feature of many garage door controllers is the ability to determine whether a garage door is open or closed. Many garage door controllers determine whether the garage door is open or closed by obtaining a status from the garage door motor, using a contact sensor, or using a tilt sensor attached to the garage door.

BRIEF DESCRIPTION OF THE SEVERAL VIEWS OF THE DRAWING(S)

Various embodiments in accordance with the present disclosure will be described with reference to the following drawings.

Like reference numerals have been used in the figures to identify like components.

DETAILED DESCRIPTION

Figure 1:
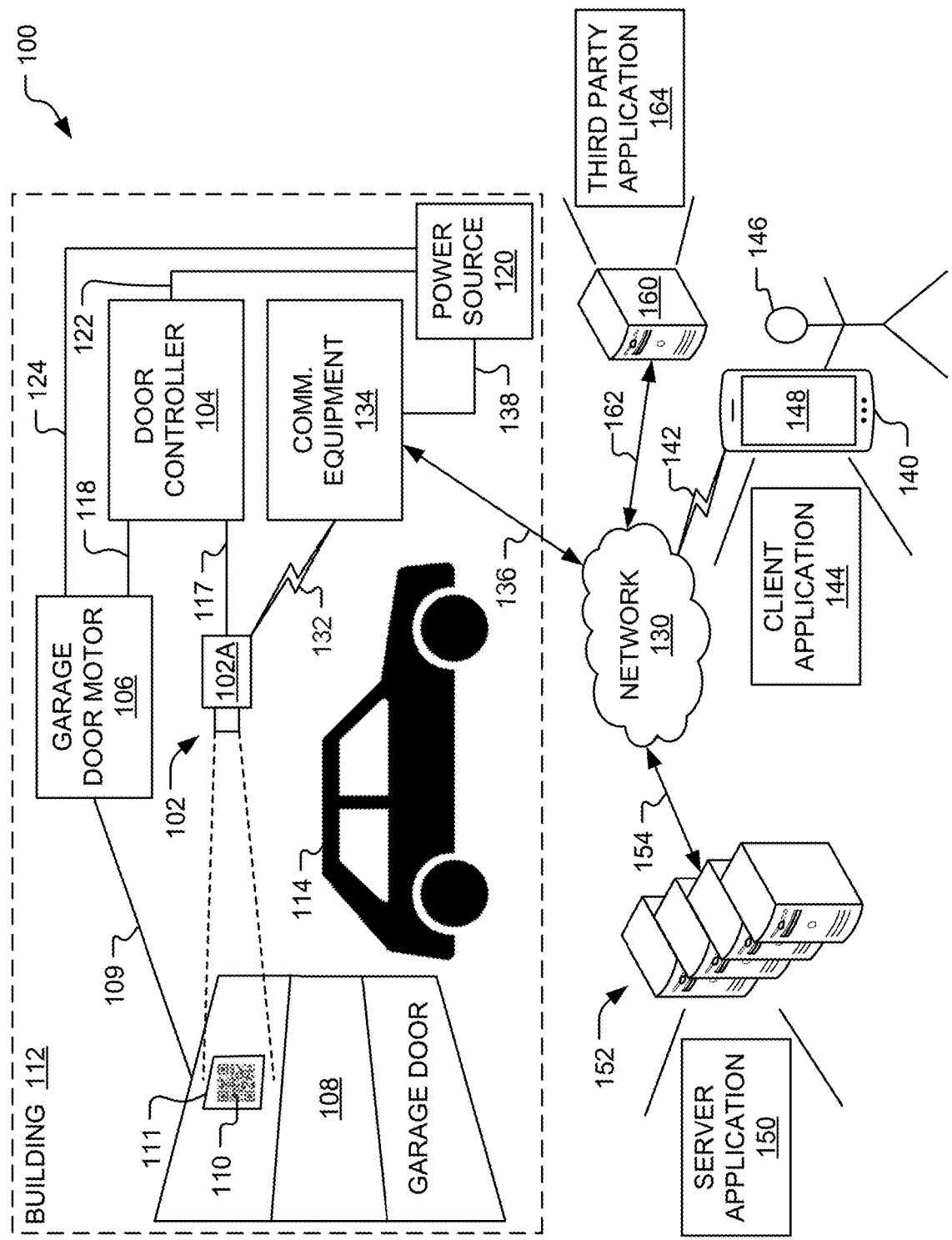
FIG. 1 is a block diagram of a computer vision-based system for controlling a door illustrated with the door in a closed state.

FIG. 1 is a block diagram illustrating a computer vision-based system 100 for controlling a door 108. While the system 100 may be used to control any type of door attached to any type of structure, for ease of illustration, the door 108 has been illustrated and will be described as being a garage door attached to a building 112 (e.g., a garage). Nevertheless, the door 108 may be implemented as another type of door attached to another type of building or other structure.

The system 100 includes at least one image capture device 102 connected to a door controller 104 (e.g., a garage door controller). In the embodiment illustrated in FIGS. 1-3, the image capture device(s) 102 include(s) a first image capture device 102A. In an embodiment illustrated in FIGS. 6 and 7, the image capture device(s) 102 include the first image capture device 102A and a second image capture device 102B. However, referring to FIG. 1, the image capture device(s) 102 may include any number of image capture devices.

Figure 2:
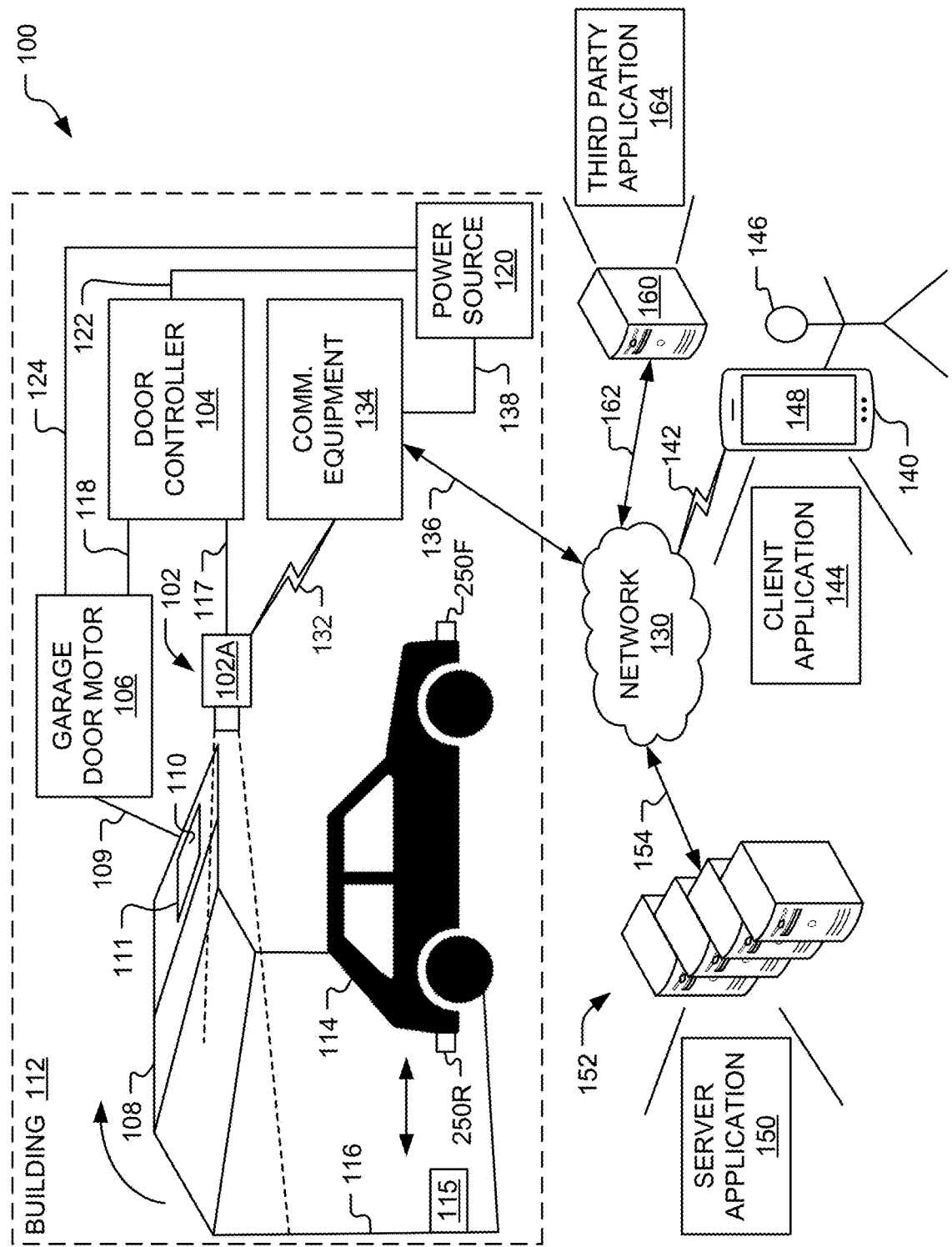
FIG. 2 is a block diagram of the computer vision-based system of FIG. 1 illustrated with the door in an open state.

Referring to FIG. 1, the door controller 104 is connected to a door motor 106 (e.g., a garage door motor) that operates the door 108 by moving the door 108 from an open position (see FIG. 2) to a closed position (see FIGS. 1 and 6) and vice versa. For example, the door motor 106 may be tethered to the door 108 by at least one movable connection 109, such as a belt, chain, cable, and the like. When the door motor 106 rotates in an opening direction, the door motor 106 moves the movable connection(s) 109 in an opening direction, which moves (e.g., lifts) the door 108 into the open position. On the other hand, when the door motor 106 rotates in a closing direction, the door motor 106 moves the movable connection(s) 109 in a closing direction, which moves (e.g., lowers) the door 108 into the closed position. When the door 108 is in the open position, it will be described herein as being in an open state. Similarly, when the door 108 is in the closed position, it will be described herein as being in a closed state. Referring to FIG. 2, an opening 116 into the building 112 is exposed when the door 108 is in the open state and the opening 116 is covered or closed by the door 108 when the door 108 is in the closed state (see FIGS. 1 and 6).

The first image capture device 102A, the door controller 104, and the door motor 106 may all be positioned in an interior of the building 112 (e.g., garage). Alternatively, one or more of the image capture device(s) 102, the door controller 104, and the door motor 106 may be at least partially positioned outside the building 112. For example, referring to FIG. 6, the second image capture device 102B may be positioned outside the building 112.

In the embodiment illustrated in FIGS. 1 and 2, the door 108 includes one or more features 110 that may be used to determine whether the door 108 is in the open or closed state. The feature(s) 110 may include a marker 111 applied to the door 108, one or more features of the door 108 itself, one or more features of the opening 116, and/or one or more features of the building 112. The feature(s) 110 may be predefined and displayed by the marker 111. The feature(s) 110 may include one or more predefined patterns, such as a Quick Response ("QR") code or other pattern that is distinguishable from background features. In the embodiment illustrated, the feature(s) 110 are included (e.g., printed) on a sheet of material (e.g., plastic, paper, cardboard, cardstock, and the like) that is affixed to a surface of the door 108 that faces into the interior of the building 112. Alternatively or additionally, the feature(s) 110 may include features of the door 108 itself, the opening 116, and/or the building 112. The feature(s) 110 may be determined using one or more machine learning technique.

The first image capture device 102A may be characterized as watching or monitoring the position or state of the door 108. The first image capture device 102A may reliably detect the location of the feature(s) 110 (e.g., a QR code) under typical conditions, which may include at least some occlusion of the feature(s) 110 by one or more objects as well as movement of the door 108. The first image capture device 102A may detect images in both visible and infrared wavelengths of the electromagnetic spectrum. In such embodiments, the feature(s) 110 may be both visible and recognizable to the first image capture device 102A in both visible and infrared wavelengths. In other words, the marker 111 may include a visible portion detectable within a set of visible wavelengths and an infrared portion detectable within a set of infrared wavelengths. The feature(s) 110 (e.g., implemented as a QR code) may be printed using a printing material (such as infrared absorb ink and the like) on a material, such as metal, paper, cardboard, plastic, and the like, that allows the feature(s) 110 to be both visible and recognizable within both visible and infrared wavelengths.

Optionally, the building 112 may house one or more vehicles, such as a vehicle 114, in its interior. Referring to FIG. 2, when the door 108 is in the open state, the opening 116 into the interior of the building 112 is exposed through which the vehicle 114 may pass to enter and exit the interior of the building 112. One or more sensor(s) 115 may be positioned alongside the opening 116 to detect when an object is under the door 108. The sensor(s) 115 may be connected to the door controller 104 and/or the door motor 106. Such sensors are common (e.g., in garage door installations) and will not be described in detail. For example, the sensor(s) 115 may be implemented as a pair of sensors aligned on opposite sides of the opening 116. One of the pair of sensors may emit a light that is detected by the other sensor on the opposite side of the opening 116 when the area under the door 108 is clear of any objects. On the other hand, when an object is positioned in the opening 116 below the door 108, the object will prevent the light from reaching the other sensor. When the sensor(s) 115 detect an object positioned in the opening 116 below the door 108, the door controller 104 and/or the door motor 106 may automatically stop any downward movement of the door 108 and may optionally open the door 108.

The first image capture device 102A is connected to the door controller 104 by a wired or wireless connection 117. The first image capture device 102A communicates with the door controller 104 over the connection 117. For example, the first image capture device 102A may capture image data and send the captured image data to the door controller 104 for analysis. In such embodiments, the door controller 104 may store the captured image data as image data 233A (see FIG. 3). If sound data is used to determine the door 108 is moving and/or the state of the door 108, the first image capture device 102A may capture sound data and send the captured sound data to the door controller 104, which may store the captured sound data as sound data 233B (see FIG. 3). Alternatively, the first image capture device 102A may capture image data, analyze the captured image data, and send a signal to the door controller 104 indicating whether the door 108 is in the open state (see FIG. 2) or the closed state (see FIGS. 1 and 6). The first image capture device 102A may communicate with the door controller 104 over the connection 117 using a communication protocol, such as Universal Serial Bus ("USB") communication protocol and the like. The first image capture device 102A may be implemented as a video camera, a security camera, a security device, a pan-tilt-zoom ("PTZ") camera, a wide field of view camera, and the like.

The door controller 104 is connected to the door motor 106 by a wired or wireless connection 118. Optionally, the door controller 104 may be connected to a power source 120 via an electrical connection 122, such as a conventional power cord. Similarly, the door motor 106 may be connected to the power source 120 via an electrical connection 124. Optionally, the first image capture device 102A may be connected to the power source 120 via an electrical connection 125 (see FIG. 3). Each of the electrical connections 122-124 may be implemented as a power cord connected to and receiving power from the power source 120 or as hardwiring (e.g., one or more conventional electrical wires) connected to an electrical circuit connected to and receiving power from the power source 120. In some embodiments, the door controller 104 may receive electrical power from the door motor 106 via the connection 118. In such embodiments, the electrical connection 122 may be omitted. By way of another non-limiting example, the door motor 106 may receive electrical power from the door controller 104 via the connection 118. In such embodiments, the electrical connection 124 may be omitted. The power source 120 may be an alternating-current ("AC") electric power supply, such as a power grid or mains electricity, or a direct-current ("DC") electric power supply, such as battery power, solar power, and the like.

Figure 3:
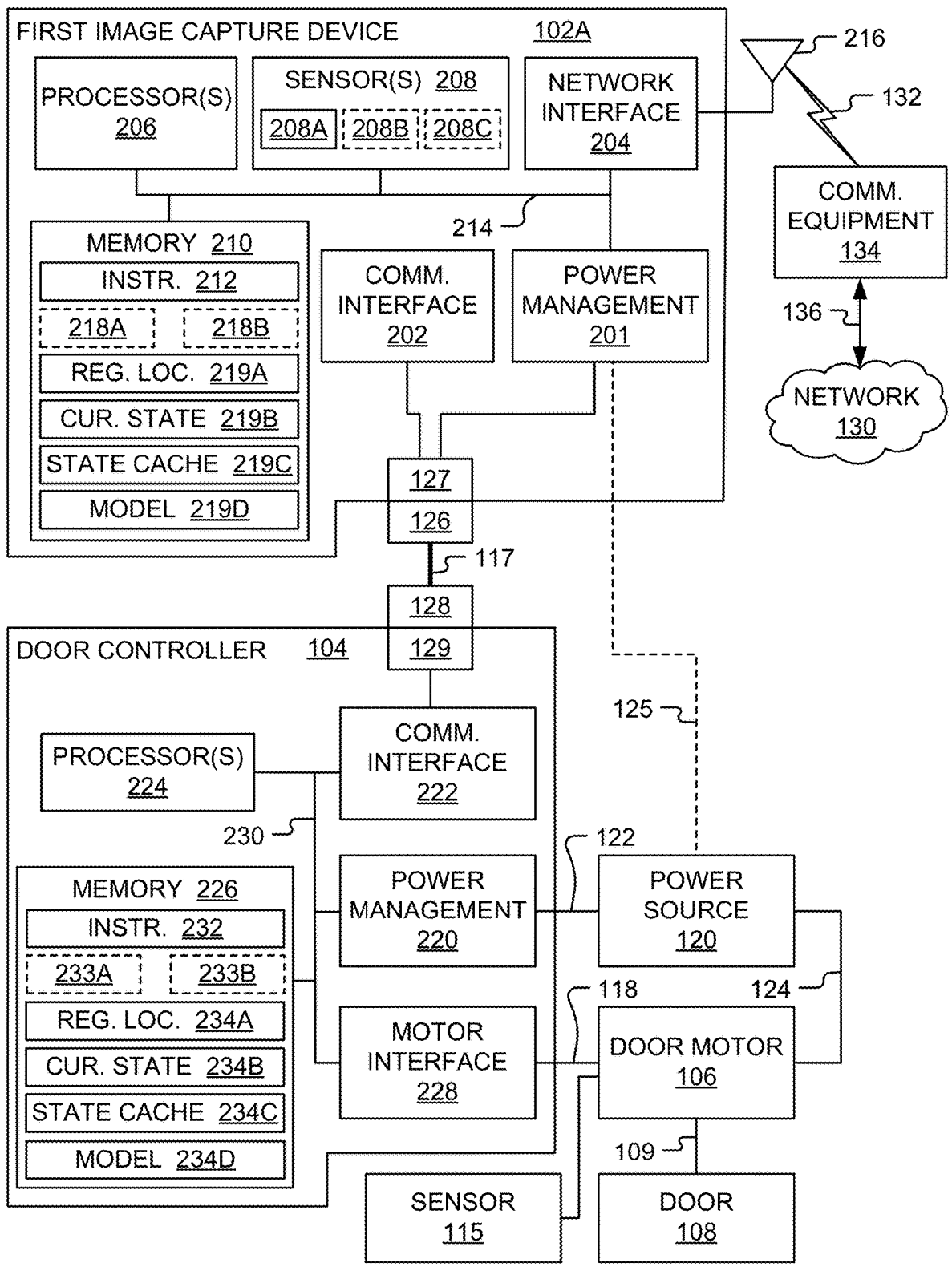
FIG. 3 is a block diagram illustrating some of the internal components of a first image capture device and a door controller of the computer vision-based system of FIG. 1.

The first image capture device 102A may be battery powered and/or may receive electrical power from the power source 120 via the electrical connection 125 (see FIG. 3). By way of another non-limiting example, the first image capture device 102A may receive electrical power from the door controller 104 via the connection 117. Referring to FIG. 3, the connection 117 may include a first connector 126 connected to a first connector 127 of the first image capture device 102A and the connection 117 may include a second connector 128 connected to a second connector 129 of the door controller 104. By way of a non-limiting example, the connection 117 may include a USB cable with its first and second connectors 126 and 128 connected to the first and second connectors 127 and 129, respectively. In such embodiments, the connectors 126-129 may each be implemented as a USB connector (e.g., a USB port or a USB plug).

Referring to FIG. 1, in the embodiment illustrated, the first image capture device 102A is connected to a network 130 (e.g., the Internet) by a wireless communication link 132 to communication equipment 134 (e.g., a router), which in turn is connected via one or more wired and/or wireless connections 136 to the network 130. The first image capture device 102A may communicate with one or more computing devices, such as a client computing device 140, over the network 130. The communication equipment 134 may be connected to the power source 120 via an electrical connection 138, such as a conventional power cord. In such embodiments, the communication equipment 134 receives electrical power from the power source 120 via the electrical connection 138. In the embodiment illustrated, the communication equipment 134 is positioned in the interior of the building 112. However, the communication equipment 134 may alternatively be positioned at least partially outside the building 112.

The client computing device 140 may be connected to the network 130 via a wired or wireless connection 142. The client computing device 140 may implement a client application 144 that receives data from the first image capture device 102A via the network 130. For example, the client computing device 140 may receive images and/or sound from the first image capture device 102A, and display the images to a user 146 using a display device 148 of the client computing device 140 and/or playback the sound to the user 146 using sound reproduction equipment of the client computing device 140. The client application 144 may send messages (e.g., data, notifications, commands, instructions, and the like) to the first image capture device 102A over the network 130. The client application 144 may generate and display a graphical user interface (not shown) on the display device 148 that displays information to and receives input from the user 146. The client computing device 140 may be implemented as any type of computing device, such as a cellular telephone, tablet computing device, personal computer, laptop computer, and the like. By way of a non-limiting example, the client computing device 140 may be implemented as a mobile communication device 1000 (see FIG. 10) or a computing device 12 (see FIG. 11). The system 100 may include any number of client computing devices, each like the client computing device 140 and each connected to the network 130 via a separate wired or wireless connection like the connection 142.

Data being communicated to and/or from the first image capture device 102A may be communicated to a cloud or server application 150 executing on one or more computing devices 152 connected to the network 130 via one or more wired and/or wireless connections 154. In such embodiments, the server application 150 receives the data (e.g., images and/or sound) from the first image capture device 102A and provides the data to the client computing device 140. Similarly, the server application 150 may receive the data (e.g., messages, data, and the like) from the client computing device 140 and provide the data to the first image capture device 102A.

One or more third-party computing devices 160 may be connected to the network 130 via one or more wired and/or wireless connections 162. The third-party computing device(s) 160 may implement a third-party application 164 that sends instructions to the first image capture device 102A over the network 130. Optionally, the third-party application 164 may communicate with the first image capture device 102A via the server application 150. The third-party application 164 may communicate with the first image capture device 102A using a protocol and/or service, such as one or more If This Then That ("IFTTT") services or other cross-device protocol(s).

Referring to FIG. 3, the first image capture device 102A includes power management circuitry 201, a communication interface 202, a network interface 204, at least one processor 206, one or more sensors 208, and memory 210 storing instructions 212 that are executable by the processor(s) 206. The processor(s) 206 is/are connected to the communication interface 202, the network interface 204, the sensor(s) 208, and the memory 210 by a bus 214. The bus 214 and other components of the first image capture device 102A may be connected to and receives power from the first connector 127. Alternatively, the bus 214 and other components of the first image capture device 102A may receive power from the power source 120 (see FIGS. 1-3, 6, and 7) via the electrical connection 125. For example, the power management circuitry 201 may be connected to and receive power from the first connector 127 and/or the electrical connection 125. The power management circuitry 201 is connected to and provides power to the other components of the first image capture device 102A. The power management circuitry 201 may be connected to the bus 214 and may provide power thereto.

The communication interface 202 includes circuitry connected to the first connector 127 and communicates with the door controller 104 over the communication connection formed between the first and second connectors 127 and 129. The communication interface 202 may receive messages from the processor(s) 206 and communicate the messages to the door controller 104 over the communication connection.

The network interface 204 includes circuitry configured to connect to the network 130 (see FIGS. 1-3, 6, and 7). In the embodiment illustrated, the first image capture device 102A includes an antenna 216 configured to connect wirelessly with the network 130. The network interface 204 is configured to communicate with the network 130 using the antenna 216. The network interface 204 may receive messages from the processor(s) 206 and communicate the messages to a device (e.g., the client computing device 140, at least one of the computing device(s) 152, and/or at least one of the third-party computing device(s) 160) over the network 130. The network interface 204 may receive messages from another device (e.g., the client computing device 140, at least one of the computing device(s) 152, and/or at least one of the third-party computing device(s) 160) over the network 130 and provide those messages to the processor(s) 206 and/or store the messages in the memory 210. The processor(s) 206 may use the communication interface 202 to forward any message received to the door controller 104 and/or may formulate a new message (e.g., based on any received message(s)) to forward to the door controller 104 using the communication interface 202.

The processor(s) 206 may each be implemented as a microprocessor, microcontroller, and the like. The processor(s) 206 is/are configured to execute the instructions 212, communicate with the door controller 104 via the communication interface 202, and communicate with a device (e.g., the client computing device 140, at least one of the computing device(s) 152, and/or at least one of the third-party computing device(s) 160) on the network 130 via the network interface 204.

The sensor(s) 208 monitor a region and may include image capture components 208A, optional sound capture components 208B, one or more optional motion sensors 208C, one or more passive infrared ("PIR") sensors, and the like. The image capture components 208A capture images of the monitored region. The image capture components 208A may continuously or intermittently capture the images. The captured images may be stored in the memory 210 as image data 218A. The optional sound capture components 208B may include a microphone. The optional sound capture components 208B record sound within the monitored region. The recorded sound may be stored in the memory 210 as sound data 218B. The optional motion sensor(s) 208C detect motion within the monitored region.

The memory 210 may include read only memory and/or random-access memory. The memory 210 may be implemented as one or more non-transitory computer-readable media. As mentioned above, the memory 210 stores the instructions 212, which, when executed by the processor(s) 206, cause the processor(s) 206 to detect the presence and/or absence of the feature(s) 110 in data collected by the sensor(s) 208. For example, the processor(s) 206 may detect the presence and/or absence of the feature(s) 110 in the image data 218A. The instructions 212 may include artificial intelligence, machine learning algorithms, and the like that detect the presence and/or absence of the feature(s) 110. Optionally, the memory 210 may store door information, such as registered door location data 219A, a current state cache 219B, and a door state cache 219C, used by the instructions 212 to determine whether the door 108 is in the open or closed state.

The door controller 104 may include power management circuitry 220, a communication interface 222, at least one processor 224, memory 226, and a motor interface 228. The processor(s) 224 is/are connected to the communication interface 222, the memory 226, and the motor interface 228 by a bus 230. The power management circuitry 220 may be connected to the bus 230 and may provide power thereto. The power management circuitry 220 receives electrical power from the power source 120 via the electrical connection 122 and provides electrical power to other components of the door controller 104, such as the processor(s) 224, the communication interface 222, the memory 226, the motor interface 228, and the bus 230.

The communication interface 222 includes circuitry connected to the connection 117 (e.g., via the second connector 129) and communicates with the first image capture device 102A over the connection 117. The communication interface 222 may receive messages from the first image capture device 102A over the connection 117 and communicate those messages to the processor(s) 224. When those messages include a notification or command to open the door 108, the processor(s) 224 may instruct the door motor 106 via the motor interface 228 to rotate in the opening direction to thereby move the movable connection(s) 109 in the opening direction and place the door 108 in the open state (see FIG. 2). In other words, if the door 108 is not in the open state, the processor(s) 224 may transition the door 108 from the closed state to the open state. On the other hand, when those messages include a notification or command to close the door 108, the processor(s) 224 may instruct the door motor 106 via the motor interface 228 to rotate in the closing direction to thereby move the movable connection(s) 109 in the closing direction and place the door 108 in the closed state (see FIGS. 1 and 6). In other words, the processor(s) 224 may transition the door 108 from the open state to the closed state and vice versa.

The processor(s) 224 may each be implemented as a microprocessor, microcontroller, and the like. The memory 226 may include read only memory and/or random-access memory. The memory 226 may be implemented as one or more non-transitory computer-readable media. The memory 226 stores instructions 232 that are executable by the processor(s) 224. The processor(s) 224 is/are configured to execute the instructions 232 (see FIG. 2), implement commands received from the first image capture device 102A and/or the second image capture device 102б (see FIGS. 6 and 7), and instruct the door motor 106 via the motor interface 228 to rotate in either the opening direction or the closed direction. Optionally, the memory 226 may store registered door location data 234A used by the instructions 232 to determine whether the door 108 is in the open or closed state.

The motor interface 228 includes circuitry configured to connect to and instruct the door motor 106. The motor interface 228 may receive instructions from the processor(s) 224 and operate the door motor 106 in accordance with those instructions.

Figure 4:
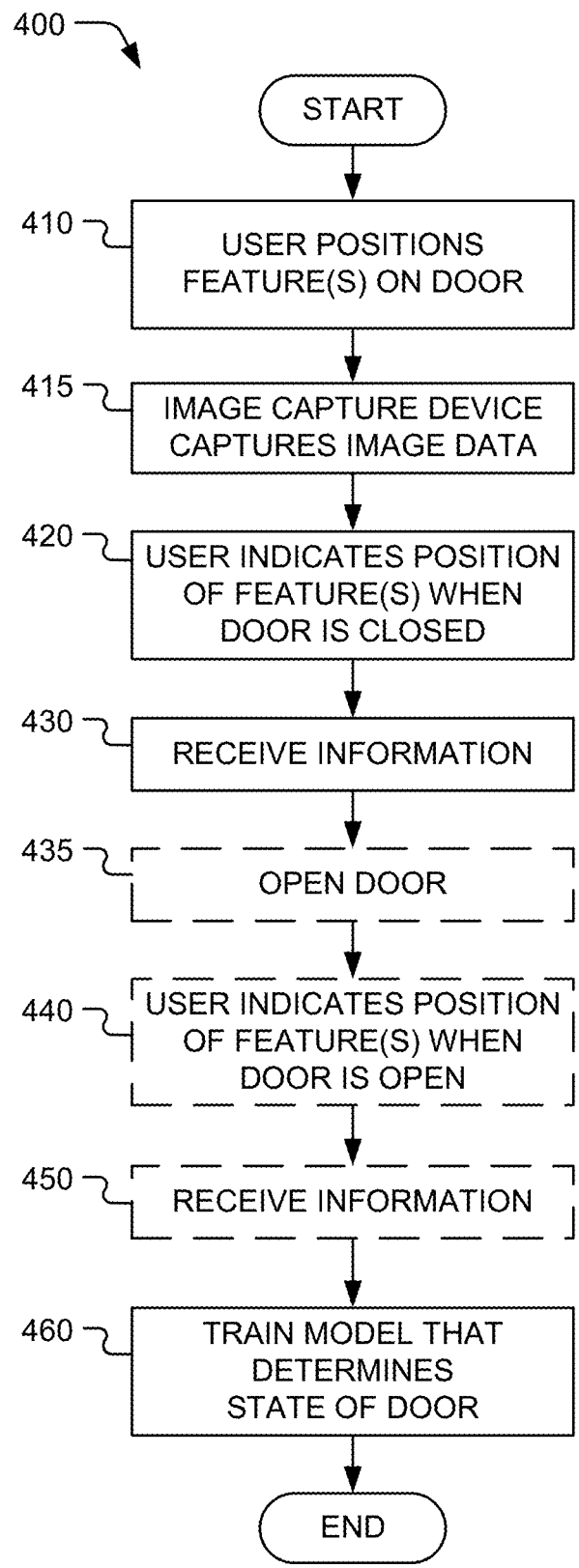
FIG. 4 is a flow diagram of a method of setting up the computer vision-based system of FIG. 1.

FIG. 4 is a flow diagram of a method 400 of setting up an embodiment of the system 100 (see FIGS. 1, 2, and 6) in which the feature(s) 110 (see FIGS. 1, 2, and 6) are implemented as and/or appear on the marker 111 (see FIGS. 1, 2, and 6) affixed to the door 108 (see FIGS. 1-3, 6, and 7). Referring to FIG. 3, the instructions 212 may cause the processor(s) 206 to perform the actions attributed to the first image capture device 102A during the performance of the method 400 (see FIG. 4) by the system 100. The instructions 232 may cause the processor(s) 224 to perform the actions attributed to the door controller 104 during the performance of the method 400 by the system 100.

Figure 6:
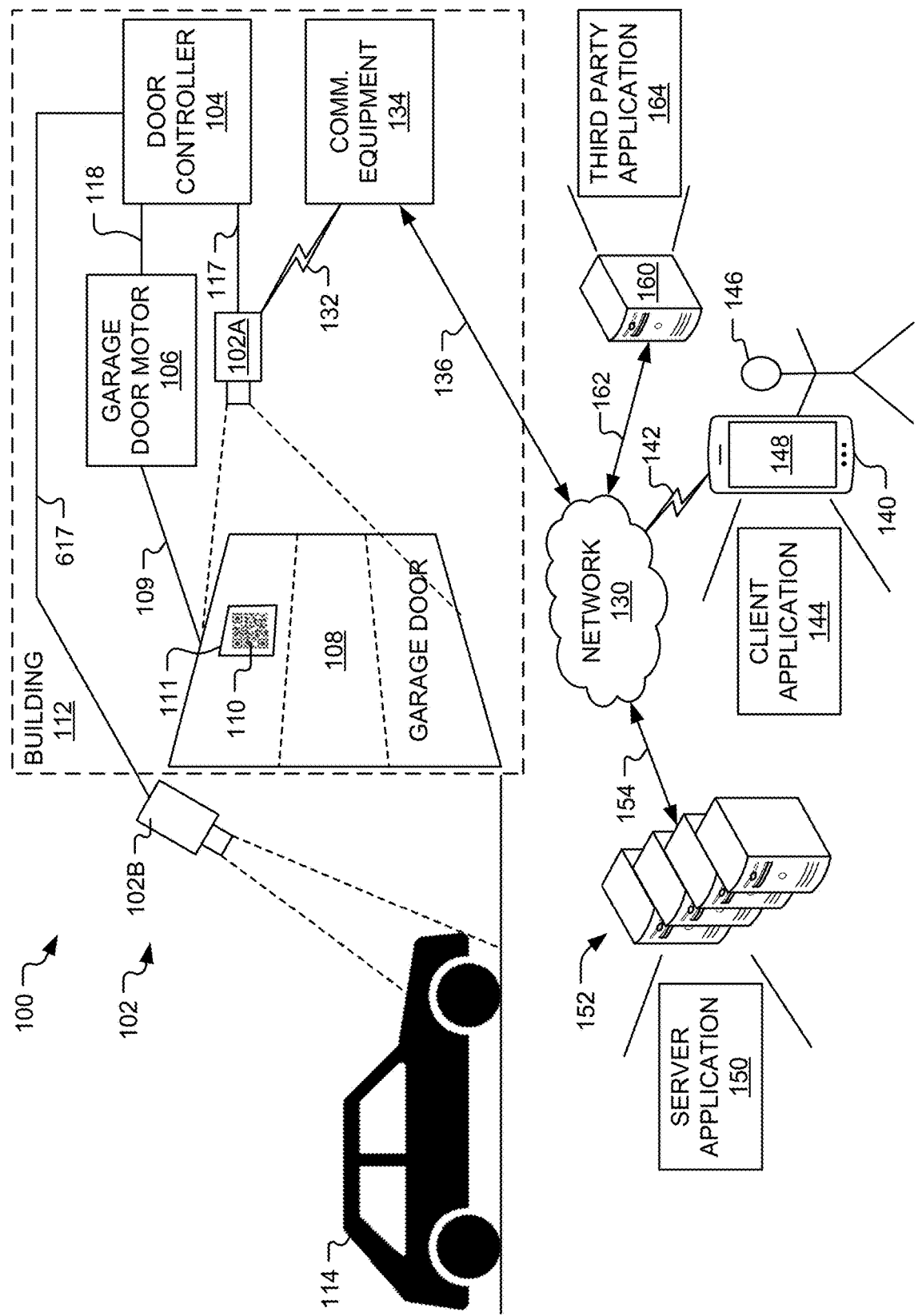
FIG. 6 is a block diagram of an embodiment of the computer vision-based system of FIG. 1 that includes a second image capture device.

Referring to FIG. 4, in first block 410, the user 146 (see FIGS. 1, 2, and 6) positions the marker 111 including the feature(s) 110 on the door 108 within the view of the first image capture device 102A (see FIGS. 1-3, 6, and 7) when the door 108 is in the closed state (see FIGS. 1 and 6). In block 410, referring to FIG. 1, the user 146 may use the graphical user interface (not shown) of the client application 144 to inform the first image capture device 102A and/or the door controller 104 that the feature(s) 110 have been positioned on the door 108 and the door 108 is in the closed state.

In block 415 (see FIG. 4), the first image capture device 102A captures images of the region that the first image capture device 102A is monitoring. Referring to FIG. 3, the image capture components 208A of the first image capture device 102A may capture the images and store them in the image data 218A. The processor(s) 206 may instruct the network interface 204 to transmit the images stored in the image data 218A to the client computing device 140 (see FIGS. 1, 2, and 6) using the antenna 216. By way of another non-limiting example, the first image capture device 102A may forward the captured images as a live stream to the user 146 via the client computing device 140. Referring to FIG. 1, the client computing device 140 may receive the images and the client application 144 may use its graphical user interface (not shown) to display the images to the user 146 via the display device 148.

Then, in block 420 (see FIG. 4), the user 146 uses the graphical user interface (not shown) of the client application 144 to identify the position of the feature(s) 110 in one or more of the images of the door 108 in the closed state, and transmit closed location information to the first image capture device 102A. Thus, after the feature(s) 110 are positioned on the door 108, the user 146 may identify the feature(s) 110 in one or more of the forwarded images. The user 146 may use the graphical user interface (not shown) of the client application 144 to mark the selected position(s) as corresponding to the closed state for the door 108. In other words, the user 146 may label one or more portions of the image(s). Such labeled data may be used by a model 219D (e.g., a machine learning process) and/or a model 234D (e.g., a machine learning process) to learn when the door 108 is in the closed state based on the position of the feature(s) 110. Optionally, the model 219D may be implemented by the instructions 212 and/or stored in the memory 210. Optionally, the model 234D may be implemented by the instructions 232 and/or stored in the memory 226.

In block 430 (see FIG. 4), the first image capture device 102A receives the closed location information provided by the user 146 in block 420. The first image capture device 102A may store the closed location information (e.g., the feature location(s) in the image(s)) in the registered door location data 219A (see FIG. 3) in the memory 210 (see FIG.

3). Alternatively or additionally, the first image capture device 102A may forward the closed location information to the door controller 104, which may receive the closed location information and store it in the registered door location data 234A (see FIG. 3) in the memory 226 (see FIG. 3).

Then, in optional block 435 (see FIG. 4), the user 146 may open the door 108 and optionally inform the first image capture device 102A and/or the door controller 104 that the door 108 is in the open state. The user 146 may use the graphical user interface (not shown) of the client application 144 to provide this information. Next, in optional block 440 (see FIG. 4), if the feature(s) 110 are visible in any of the images, the user 146 may use the graphical user interface (not shown) of the client application 144 to identify the position of the feature(s) 110 in one or more of the images of the door 108 in the open state and transmit open location information to the first image capture device 102A. Thus, the user 146 may identify the feature(s) 110 in one or more of the forwarded images and may use the client application 144 to mark the selected position(s) as corresponding to the open state for the door 108. In other words, the user 146 may label one or more portions of the image(s). Such labeled data may be used by the model 219D and/or the model 234D to learn when the door 108 is in the open state based on the position(s) of the feature(s) 110.

In optional block 450 (see FIG. 4), the first image capture device 102A may receive the open location information provided by the user 146 in optional block 440 (see FIG. 4). The first image capture device 102A may store the open location information in the registered door location data 219A in the memory 210. Alternatively or additionally, the first image capture device 102A may forward the open location information to the door controller 104, which may receive the open location information and store it in registered door location data 234A (see FIG. 3) in the memory 226 (see FIG. 3).

Next, in block 460 (see FIG. 4), the instructions 212 may train the model 219D using the registered door location data 219A as training data and/or the instructions 232 may train the model 234D using the registered door location data 234A (see FIG. 3) as training data. The model 219D and/or the model 234D may be implemented using a machine learning process that may be trained via supervised learning using labeled data. When training is complete, the model 219D and/or the model 234D may receive new images as input and output the state of door 108, which is either the closed state or a not closed state. The not closed state includes any state other than the closed state, such as the open state.

Optionally, the model 219D and/or the model 234D may identify one or more features of the door 108 other than those included on the marker 111, one or more features of the opening 116, and/or one or more features of the building 112 that indicate the state of door 108. When this occurs, the model 219D and/or the model 234D may use these identified features to determine the state of the door 108 and the feature(s) 110 included on the marker 111 may no longer be used allowing the marker 111 to be removed from the door 108.

Then, the method 400 (see FIG. 4) terminates. At this point, the first image capture device 102A may capture new images of the door 108, the opening 116, and/or the building 112 and use the model 219D to determine whether the door 108 is in the closed or not closed state based at least in part on the new images. Alternatively or additionally, the first image capture device 102A may forward the new images to the door controller 104, which may use the model 234D to determine whether the door 108 is in the closed or not closed state based at least in part on the forwarded images. Thus, the first image capture device 102A and/or the door controller 104 may determine whether the door 108 is in the closed or not closed state.

Figure 5:
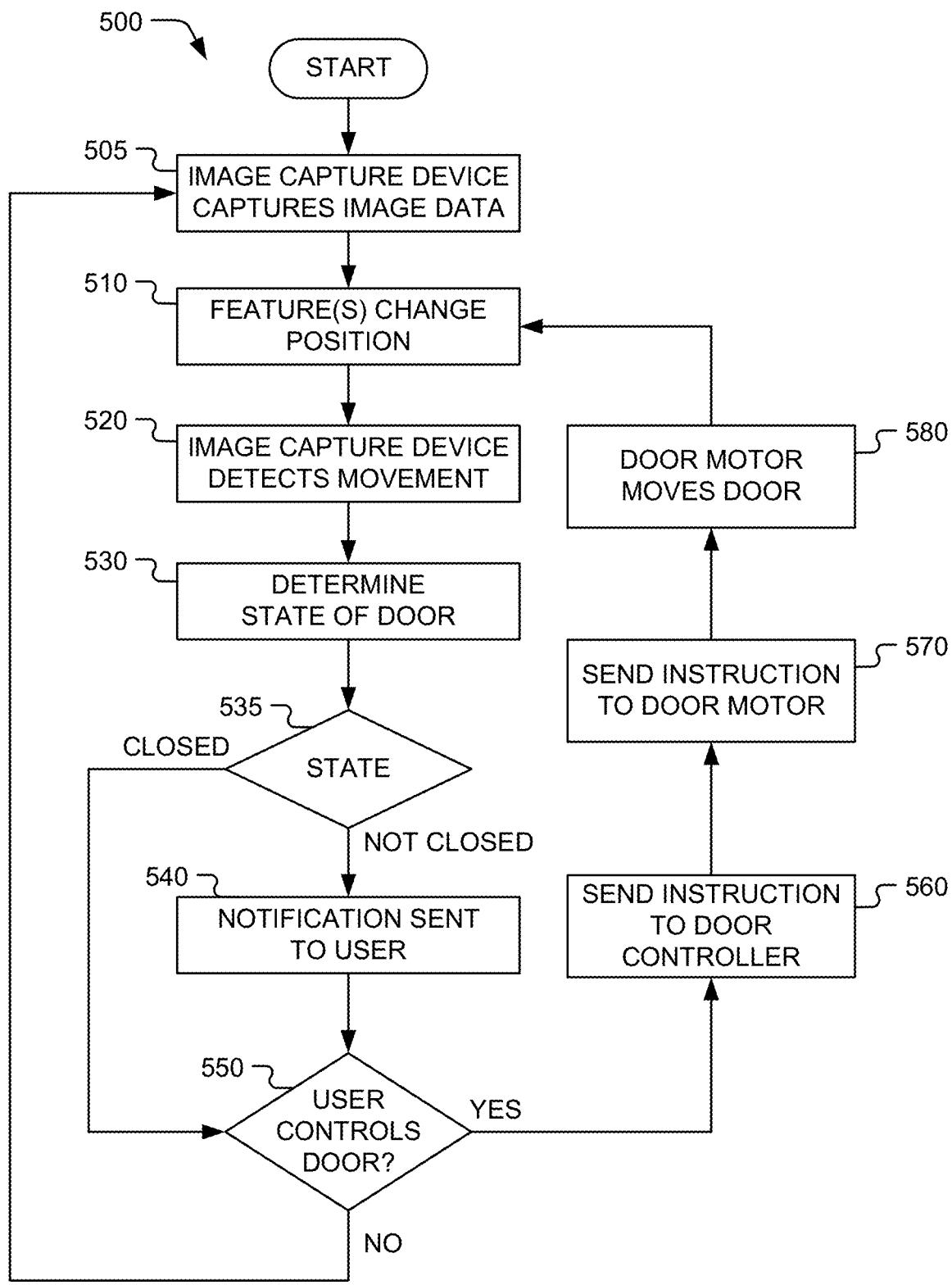
FIG. 5 is a flow diagram of a method that may be performed by the computer vision-based system of FIG. 1.

The first image capture device 102A and/or the door controller 104 may change the position or state of the door 108. For example, FIG. 5 is a flow diagram of a method 500 of controlling the position of the door 108 (see FIGS. 1-3, 6, and 7) that may be performed by the system 100 (see FIGS. 1, 2, and 6). Referring to FIG. 3, the instructions 212 may cause the processor(s) 206 to perform the actions attributed to the first image capture device 102A during the performance of the method 500 (see FIG. 5) by the system 100. The instructions 232 may cause the processor(s) 224 to perform the actions attributed to the door controller 104 during the performance of the method 500 by the system 100.

Referring to FIG. 2, in first block 505 (see FIG. 5), the first image capture device 102A captures images of the region that the first image capture device 102A is monitoring and may store the captured images in the image data 218A (see FIG. 3). The monitored region may include the feature(s) 110, the door 108, and/or the opening 116. In block 510 (see FIG. 5), the feature(s) 110 and/or the door 108 change(s) position.

Next, in block 520 (see FIG. 5), the first image capture device 102A determines the door 108 is moving or has moved. The first image capture device 102A may make this determination by using the motion sensor(s) 208C (see FIG. 3), detecting door sounds using the optional sound capture components 208B (see FIG. 3), and/or analyzing two or more successive images in the image data 218A (see FIG. 3) captured by the image capture components 208A (see FIG. 3). In block 520 (see FIG. 5), the first image capture device 102A may detect movement of the feature(s) 110 or the door 108 itself. The first image capture device 102A may determine a direction of movement from the successive images. By way of another non-limiting example, the motion sensor(s) 208C (see FIG. 3) may indicate that the door 108 has moved when the motion sensor(s) 208C detect(s) more than a threshold amount of motion has occurred.

Next, in block 530 (see FIG. 5), the first image capture device 102A and/or the door controller 104 determine the state of the door 108. For example, the first image capture device 102A may use the model 219D (see FIG. 3) and/or the door controller 104 may use the model 234D (see FIG. 3) to determine the state of the door 108. If the door controller 104 determined the state of the door 108, the door controller 104 provides the state of the door 108 to the first image capture device 102A. If the door 108 is determined to be in the closed state, the decision in decision block 535 (see FIG. 5) is "CLOSED," and the first image capture device 102A advances to decision block 550 (see FIG. 5). On the other hand, if the door 108 is determined to not be in the closed state, the decision in decision block 535 is "NOT CLOSED," and the first image capture device 102A advances to block 540 (see FIG. 5).

In block 540 (see FIG. 5), the first image capture device 102A sends a notification to the client computing device 140 (e.g., via the computing device(s) 152) indicating that the door 108 has moved and/or providing the state of the door 108. Thus, the first image capture device 102A does not send the notification to the user 146 when the door 108 is determined to be in the closed state. On the other hand, the first image capture device 102A will send the notification to the user 146 when the door 108 is determined to be in the not closed state. At this point, the user 146 may decide to change the state of the door 108.

In decision block 550 (see FIG. 5), the first image capture device 102A decides whether the user 146 has indicated that the user 146 would like to change the state of the door 108. The user 146 may use the graphical user interface (not shown) of the client application 144 to inform the first image capture device 102A that the user 146 would like to reposition the door 108. The decision in decision block 550 is "YES" when the user 146 has indicated that the user 146 would like to reposition the door 108. Otherwise, the decision in decision block 550 is "NO." When the decision is "NO," the first image capture device 102A returns to block 505 (see FIG. 5). On the other hand, when the decision is "YES," in block 560 (see FIG. 5), the first image capture device 102A sends an instruction to the door controller 104 informing the door controller 104 how the user 146 would like to reposition the door 108. For example, the instruction may instruct the door controller 104 to close or open the door 108. Then, in block 570 (see FIG. 5), the door controller 104 sends an instruction to the door motor 106 instructing the door motor 106 to move (e.g., lift or lower) the door 108. In block 580, the door motor 106 moves the door 108. Then, the system 100 returns to block 510.

FIG. 6 is a block diagram of an embodiment of the system 100 that includes the second image capture device 102B. Like reference numerals have been used to identify like components in the systems of FIGS. 1-3, 6, and 7. Referring to FIG. 6, the second image capture device 102B may be positioned to capture images outside the building 112. For example, the second image capture device 102B may be positioned outside the building 112, inside the building 112 facing a window, and the like. The second image capture device 102B is connected to the door controller 104 by a wired or wireless connection 617 and communicates with the door controller 104 over the connection 617. For example, the second image capture device 102B may capture image data and send the captured image data to the door controller 104 for analysis. In such embodiments, the door controller 104 may store the captured image data as image data 733A (see FIG. 7). If the second image capture device 102B captures sound data, the second image capture device 102B may capture sound data and send the captured sound data to the door controller 104, which may store the captured sound data as sound data 733B (see FIG. 7). Alternatively, the second image capture device 102B may capture image data, analyze the captured image data, and send a signal to the door controller 104 indicating whether the door 108 should be opened or closed. The second image capture device 102B may communicate with the door controller 104 over the connection 617 using a communication protocol, such as USB communication protocol and the like. The second image capture device 102B may be implemented using any of the devices suitable for implementing the first image capture device 102A. By way of non-limiting examples, the second image capture device 102B may be implemented as a pan-tilt-zoom ("PTZ") camera, a wide field of view camera, and the like.

Figure 7:
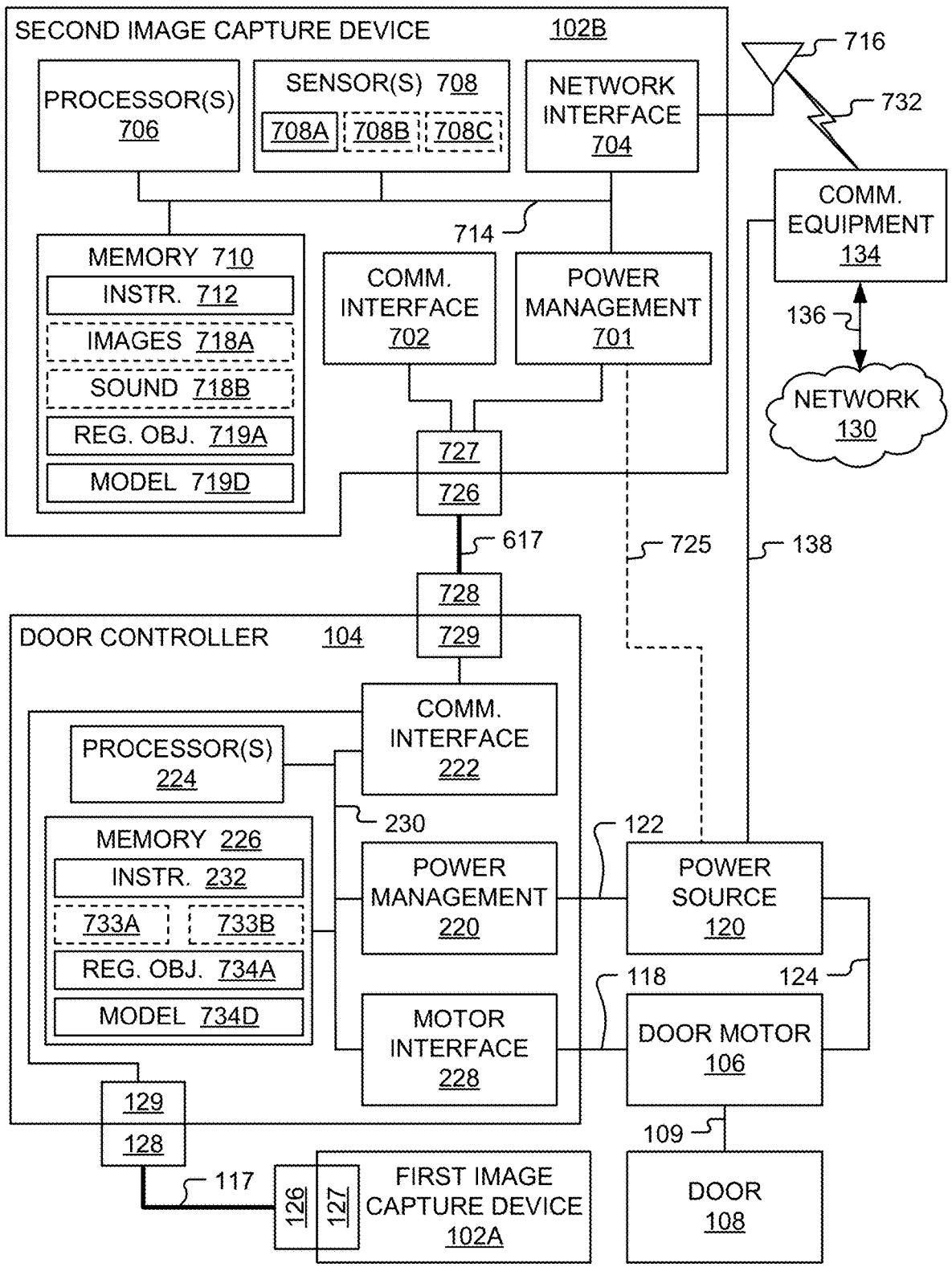
FIG. 7 is a block diagram illustrating some of the internal components of the second image capture device and the door controller of the computer vision-based system of FIG. 6.

Referring to FIG. 7, the connection 617 may include a first connector 726 connected to a first connector 727 of the second image capture device 102B and the connection 617 may include a second connector 728 connected to a second connector 729 of the door controller 104. By way of a non-limiting example, the connection 617 may include a USB cable with the first and second connectors 726 and 728 connected to the first and second connectors 727 and 729, respectively. In such embodiments, the connectors 726-729 may each be implemented as a USB connector (e.g., a USB port or a USB plug).

The second image capture device 102B includes power management circuitry 701, a communication interface 702, a network interface 704, at least one processor 706, one or more sensors 708, and memory 710 that, referring to FIG. 3, are substantially identical to the power management circuitry 201, the communication interface 202, the network interface 204, the processor(s) 206, the sensor(s) 208, and the memory 210, respectively, of the first image capture device 102A. Referring to FIG. 7, the processor(s) 706 is/are connected to the communication interface 702, the network interface 704, the sensor(s) 708, and the memory 710 by a bus 714. The bus 714 and other components of the second image capture device 102B may be connected to and receives power from the first connector 727. Alternatively, the bus 714 and other components of the second image capture device 102B may receive power from the power source 120 via an electrical connection 725 that may be substantially identical to the electrical connection 125 (see FIG. 3). For example, the power management circuitry 701 may be connected to and receive power from the first connector 727 and/or the electrical connection 725. The power management circuitry 701 is connected to and provides power to the other components of the second image capture device 102B. The power management circuitry 701 may be connected to the bus 714 and may provide power thereto.

The network interface 704 includes circuitry configured to connect to the network 130. In the embodiment illustrated, the second image capture device 102B includes an antenna 716 configured to connect wirelessly with the network 130. The network interface 704 is configured to communicate with the network 130 using the antenna 716. The second image capture device 102B may be connected to the network 130 (e.g., the Internet) by a wireless communication link 732 with the communication equipment 134 (e.g., a router), which in turn is connected via the connection(s) 136 to the network 130. The second image capture device 102B may communicate with one or more computing devices, such as the client computing device 140 (see FIGS. 1, 2, and 6), over the network 130 (e.g., using the network interface 704 and the antenna 716).

The sensor(s) 708 monitor(s) an approach or external region adjacent to the door 108 and may include any of the sensors included in the sensor(s) 208 (see FIG. 3). For example, the sensor(s) 708 may include image capture components 708A like the image capture components 208A (see FIG. 3), optional sound capture components 708B like the optional sound capture components 208B (see FIG. 3), and one or more optional motion sensors 708C like the optional motion sensor(s) 208C (see FIG. 3). Like the image capture components 208A, the image capture components 708A capture images of the monitored external region. The image capture components 708A may continuously or intermittently capture the images. The captured images may be stored in the memory 710 as image data 718A. The optional sound capture components 708B may include a microphone. Like the optional sound capture components 208B, the optional sound capture components 708B record sound within the monitored external region. The recorded sound may be stored in the memory 710 as sound data 718B. The optional motion sensor(s) 708C detect motion within the monitored external region.

The memory 710 stores instructions 712 that are executable by the processor(s) 706. The memory 710 may store approved or registered object data 719A that the instructions 712 may use to identify one or more approved objects, such as the vehicle 114, the user 146, and the like. The instructions 712 may include or have access to a model 719D (e.g., a machine learning process) that determines whether an object has been registered with the system 100 (see FIGS. 1, 2, and 6).

In the embodiment illustrated in FIG. 7, the communication interface 222 of the door controller 104 includes circuitry connected to the connection 617 (e.g., via the second connector 729) and communicates with the second image capture device 102B over the connection 617. The communication interface 222 may receive messages from the second image capture device 102B over the connection 617 and communicate those messages to the processor(s) 224. When those messages include a notification or command to open the door 108, the processor(s) 224 may instruct the door motor 106 via the motor interface 228 to rotate in the opening direction to thereby move the movable connection(s) 109 in the opening direction and place the door 108 in the open state (see FIG. 2). In other words, if the door 108 is not in the open state, the processor(s) 224 may transition the door 108 from the closed state to the open state. On the other hand, when those messages include a notification or command to close the door 108, the processor(s) 224 may instruct the door motor 106 via the motor interface 228 to rotate in the closing direction to thereby move the movable connection(s) 109 in the closing direction and place the door 108 in the closed state (see FIGS. 1 and 6). In other words, the processor(s) 224 may transition the door 108 from the open state to the closed state and vice versa.

In the embodiment illustrated in FIG. 7, the memory 226 of the door controller 104 stores the image data 733A, the sound data 733B, registered object data 734A, and a model 734D. The instructions 712 may use the registered object data 734A to identify one or more approved objects, such as the vehicle 114, the user 146, and the like. Optionally, the model 734D (e.g., a machine learning process) may be implemented by the instructions 232 and/or is accessible by the instructions 232. The model 734D may determine whether an object has been registered with the system 100 (see FIGS. 1, 2, and 6). The processor(s) 224 is/are configured to execute the instructions 232 (see FIG. 2), implement commands received from the first image capture device 102A and/or the second image capture device 102B (see FIGS. 6 and 7), and instruct the door motor 106 via the motor interface 228 to rotate in either the opening direction or the closed direction.

The second image capture device 102B is positioned to capture images of objects (e.g., the vehicle 114, the user 146, and the like) as the objects approach the door 108. For example, the second image capture device 102B may detect when the vehicle 114 approaches the door 108, recognize the vehicle 114 as an approved object registered with the system 100, and open the door 108 to allow the vehicle 114 to enter the building 112. Then, the first image capture device 102A and/or the second image capture device 102B may close the door 108 when the vehicle 114 is positioned entirely inside the building 112. When the object is the vehicle 114, the first image capture device 102A and/or the second image capture device 102B may be positioned to view status of the door(s) of the vehicle 114, which may be used to indicate when the vehicle 114 is not moving (e.g., when the doors are in an open state).

The second image capture device 102B may detect when the vehicle 114 approaches the door 108 by monitoring the image data for at least a threshold amount of motion. By way of another non-limiting example, the optional motion sensor(s) 708C may detect that the vehicle 114 has approached the door 108 when the optional motion sensor(s) 708C detect(s) more than a threshold amount of motion has occurred.

The instructions 712 may include artificial intelligence, machine learning algorithms, and the like that detect an approved object (e.g., the vehicle 114) by looking and/or listening for the object. For example, the model 719D (e.g., a machine learning process) may determine whether an object has been registered with the system 100 (see FIGS. 1, 2, and 6). If the object has been registered, the second image capture device 102B may instruct the door controller 104 to instruct the door motor 106 to open the door 108. On the other hand, if the object has not been registered, the second image capture device 102B may do nothing.

Alternatively or additionally, the door controller 104 may detect when the vehicle 114 approaches the door 108 by monitoring the image data 733A received from the second image capture device 102B for at least a threshold amount of motion and/or the sound data 733B received from the second image capture device 102B for object sounds. The instructions 232 may include artificial intelligence, machine learning algorithms, and the like that detect the object (e.g., the vehicle 114) by looking and/or listening for the object. For example, the model 734D (e.g., a machine learning process) may determine whether the object has been registered with the system 100 (see FIGS. 1, 2, and 6). If the object has been registered, the door controller 104 may instruct the door motor 106 to open the door 108. On the other hand, if the object has not been registered, the door controller 104 may do nothing.

Figure 8:
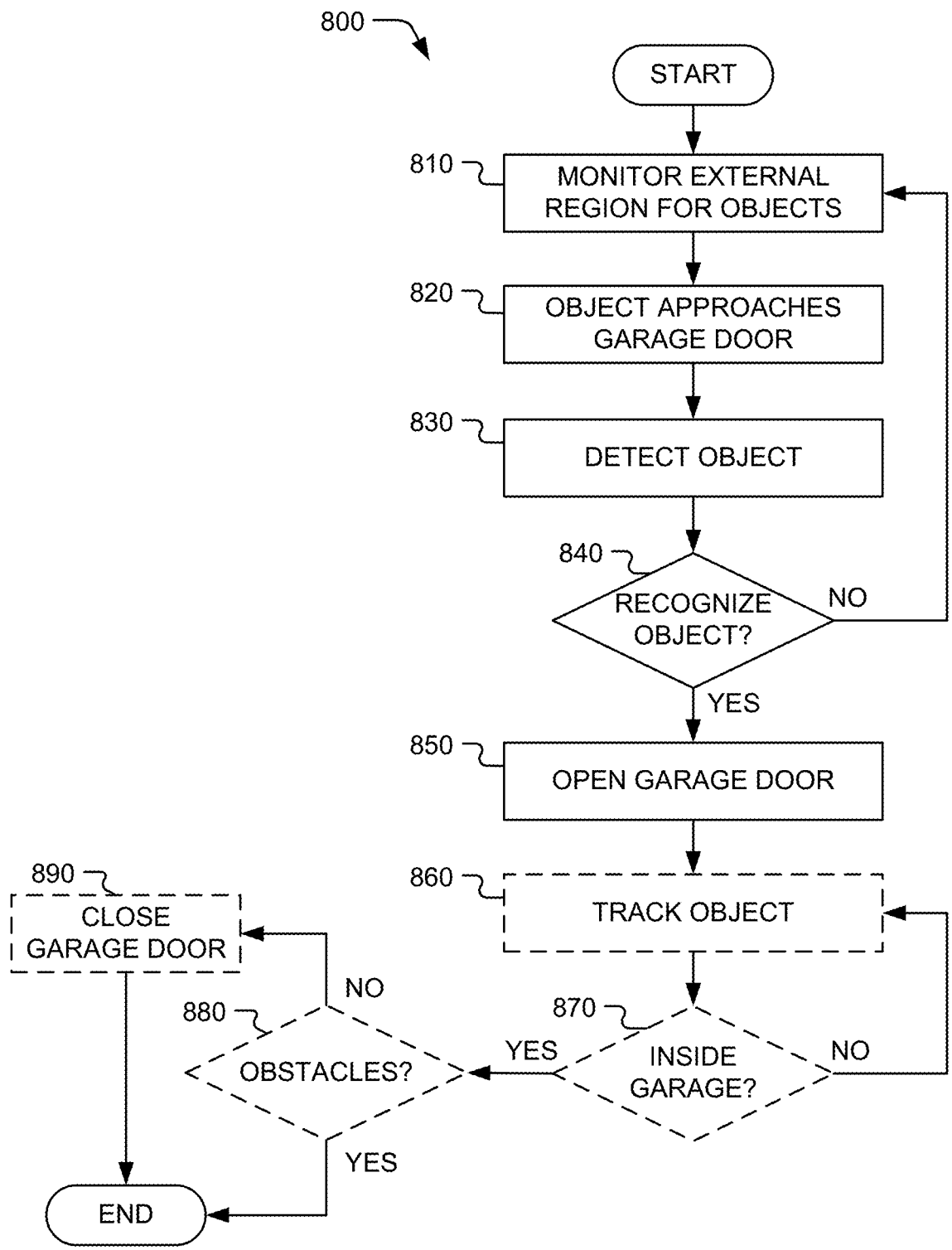
FIG. 8 is a flow diagram of a method that may be performed by the computer vision-based system illustrated in FIG. 6.

FIG. 8 is a flow diagram of a method that may be performed by an embodiment of the system 100 that includes the second image capture device 102B. Referring to FIG. 7, the instructions 712 may cause the processor(s) 706 to perform the actions attributed to the second image capture device 102B during the performance of the method 800 (see FIG. 8) by the system 100. The instructions 232 may cause the processor(s) 224 to perform the actions attributed to the door controller 104 during the performance of the method 800 by the system 100.

Before the method 800 is performed, referring to FIG. 6, the user 146 may register one or more objects with the system 100. For example, the user 146 may position an object in the external region monitored by the second image capture device 102B. The second image capture device 102B captures images of the object in the external region and may store them in the image data 718A.

Referring to FIG. 7, the processor(s) 706 may instruct the network interface 704 to transmit the captured images (e.g., stored in the image data 718A) to the client computing device 140 (see FIGS. 1, 2, and 6) using the antenna 716. By way of another non-limiting example, the second image capture device 102B may forward the captured images as a live stream to the user 146 via the client computing device 140. Referring to FIG. 6, the client computing device 140 may receive the images and the graphical user interface (not shown) of the client application 144 may display the images to the user 146 via the display device 148.

Then, the user 146 may use the graphical user interface (not shown) of the client application 144 to identify the object in at least one of the images and transmit object information to the second image capture device 102B. Referring to FIG. 7, the second image capture device 102B may store the object information in the registered object data 719A in the memory 710. Alternatively or additionally, the second image capture device 102B may forward the object information to the door controller 104, which may receive the object information and store it in the registered object data 734A in the memory 226. In other words, the user 146 may label one or more portions of the image(s) as containing the object. Such labeled data may be used by the model 719D and/or the model 734D to learn to identify an approved object and/or determine when the approved object has approached the door 108.

The instructions 712 may train the model 719D using the registered object data 719A as training data and/or the instructions 232 may train the model 734D using the registered object data 734A as training data. The model 719D and/or the model 734D may be implemented using a machine learning process that may be trained via supervised learning using labeled data. When training is complete, the model 719D and/or the model 734D may receive images as input and output whether the approved object is present in the images.

In first block 810 (see FIG. 8), the second image capture device 102B monitors the external region for objects. For example, the second image capture device 102B may capture images depicting the external region and/or sound generated by the objects. In block 820 (see FIG. 8), an object, such as the vehicle 114, the user 146, and the like, approaches the door 108. In block 830 (see FIG. 8), the second image capture device 102B detects the object.

In decision block 840 (see FIG. 8), the second image capture device 102B determines whether the second image capture device 102B recognizes the object. For example, the model 719D may determine whether an approved object has approached the door 108. Thus, the output of the model 719D may determine whether the second image capture device 102B recognizes the object. By way of a non-limiting example, the model 719D may use one or more features of the object. For example, if the object is the vehicle 114, the model 719D may recognize the color of the vehicle 114, the license plate of the vehicle 114, or other features of the vehicle 114. In decision in decision block 840 (see FIG. 8) is "YES," when the second image capture device 102B recognizes the object. Otherwise, the decision in decision block 840 is "NO." When the decision in decision block 840 is "NO," the second image capture device 102B returns to block 810 (see FIG. 8). On the other hand, when the decision in decision block 840 is "YES," the second image capture device 102B advances to block 850 (see FIG. 8).

In block 850 (see FIG. 8), the second image capture device 102B causes the door 108 to open. In block 850, the second image capture device 102B may instruct the door controller 104 and/or the door motor 106 to open the door 108. When the second image capture device 102B instructs the door controller 104, the door controller 104 instructs the door motor 106 to rotate in the opening direction and open the door 108. When the second image capture device 102B instructs the door motor 106, the door motor 106 rotates in the opening direction and opens the door 108. In other words, the second image capture device 102B may operate or replace a conventional garage door opener.

In optional block 860 (see FIG. 8), the first image capture device 102A and/or the second image capture device 102B tracks the position of the object with respect to the door 108. Then, in optional decision block 870 (see FIG. 8), the first image capture device 102A and/or the second image capture device 102B determine(s) whether the object is fully inside the building 112. In decision in optional decision block 870 is "YES," when the object is determined to be fully inside the building 112. Otherwise, the decision in optional decision block 870 is "NO." When the decision in optional decision block 870 is "NO," the first image capture device 102A and/or the second image capture device 102B return(s) to optional block 860 (see FIG. 8) and continues tracking the object.

On the other hand, when the decision in optional decision block 870 (see FIG. 8) is "YES," in optional decision block 880 (see FIG. 8), the system 100 determines whether there are any obstacles that would prevent the door 108 from closing. By way of non-limiting examples, the sensor(s) 115, the first image capture device 102A, and/or the second image capture device 102B may detect if there are any such obstacles. The decision in optional decision block 880 is "YES," when the system 100 detects an obstacle that would prevent the door 108 from closing. Otherwise, the decision in optional decision block 880 is "NO." When the decision in optional decision block 880 is "YES," the system 100 prevents the door 108 from closing and the method 800 terminates. On the other hand, when the decision in optional decision block 880 is "NO," the system 100 advances to optional block 890 (see FIG. 8).

In optional block 890 (see FIG. 8), the first image capture device 102A and/or the second image capture device 1026 cause(s) the door 108 to close. In optional block 890, the first image capture device 102A and/or the second image capture device 1026 may instruct the door controller 104 and/or the door motor 106 to close the door 108. When the second image capture device 102B instructs the door controller 104, the door controller 104 instructs the door motor 106 to rotate in the closing direction and close the door 108. When the door motor 106 is instructed to close the door 108 by the first image capture device 102A, the second image capture device 1026, and/or the door controller 104, the door motor 106 rotates in the closing direction and closes the door 108. Thus, as mentioned above, the first image capture device 102A and/or the second image capture device 1026 may operate like and/or replace a conventional garage door opener. After optional block 890, the method 800 terminates.

In an alternate embodiment, in block 830 (see FIG. 8), the second image capture device 1026 may forward the images to the door controller 104. In decision block 840 (see FIG. 8), the door controller 104 may use the model 734D to determine whether the door controller 104 recognizes the object. Like the model 719D, the model 734D may use one or more features of the object. For example, if the object is the vehicle 114, the model 734D may recognize the color of the vehicle 114, the license plate of the vehicle 114, or other features of the vehicle 114. The decision in decision block 840 (see FIG. 8) is "YES," when the door controller 104 recognizes the object. Otherwise, the decision in decision block 840 is "NO." The door controller 104 may inform the second image capture device 1026 of the decision in decision block 840. In block 850 (see FIG. 8), the door controller 104 causes the door 108 to open by instructing the door motor 106 to rotate in the opening direction and open the door 108.

The user 146 may visually observe the door 108 and use the graphical user interface (not shown) of the client application 144 to send a command to the first image capture device 102A and/or the second image capture device 102B, when present, instructing the first image capture device 102A and/or the second image capture device 102B, when present, to change the state of the door 108. The user 146 may use the graphical user interface (not shown) of the client application 144 to indicate a desired state of the door 108. In response, the first image capture device 102A and/or the second image capture device 102B may send an instruction to the door controller 104 instructing the door controller 104 to move the door 108 to the desired state. After receiving this instruction, the door controller 104 may send an instruction to the door motor 106 instructing the door motor 106 to rotate in the appropriate direction to place the door 108 in the desired state.

Referring to FIG. 2, the vehicle 114 may be equipped with a vehicle computing system connected to at least one onboard image capture device. The system 100 may communicate wirelessly with the vehicle computing system (not shown) of the vehicle 114, which may transmit one or images to the system 100 that are captured by the onboard image capture device(s). Thus, in addition to the first image capture device 102A and the second image capture device 102B, the system may include or access the onboard image capture device(s). By way of a non-limiting example, the vehicle 114 may have a rear facing image capture device 250R and/or a forward-facing image capture device 250F. In block 830, the second image capture device 102B may detect the object by receiving wireless communications from the vehicle computing system (not shown), such as images. In optional block 860, the first image capture device 102A and/or the second image capture device 102B may track the object as the object passes through the opening 116 using one or more images captured by the onboard vehicle image capture device(s). In optional block 880, the system 100 may use one or more of the images captured by the onboard vehicle image capture device(s) to detect if there are any obstacles under the door 108.

As mentioned above, the marker 111 (e.g., displaying a QR code) affixed to the door 108 may include the feature(s) 110. In some embodiments, the marker 111 may be removed after the instructions 212 have repeatedly detected the state of the door 108 using the marker 111 and learned at least one other feature (e.g., using a machine learning technique) that indicates whether the door 108 is the open or closed state. For example, the information obtained by using the marker 111 to determine the state of the door 108 may be used as a training set of labeled data to train a machine learning model via supervised learning to determine whether a garage door is in the open or closed state.

Figure 9:
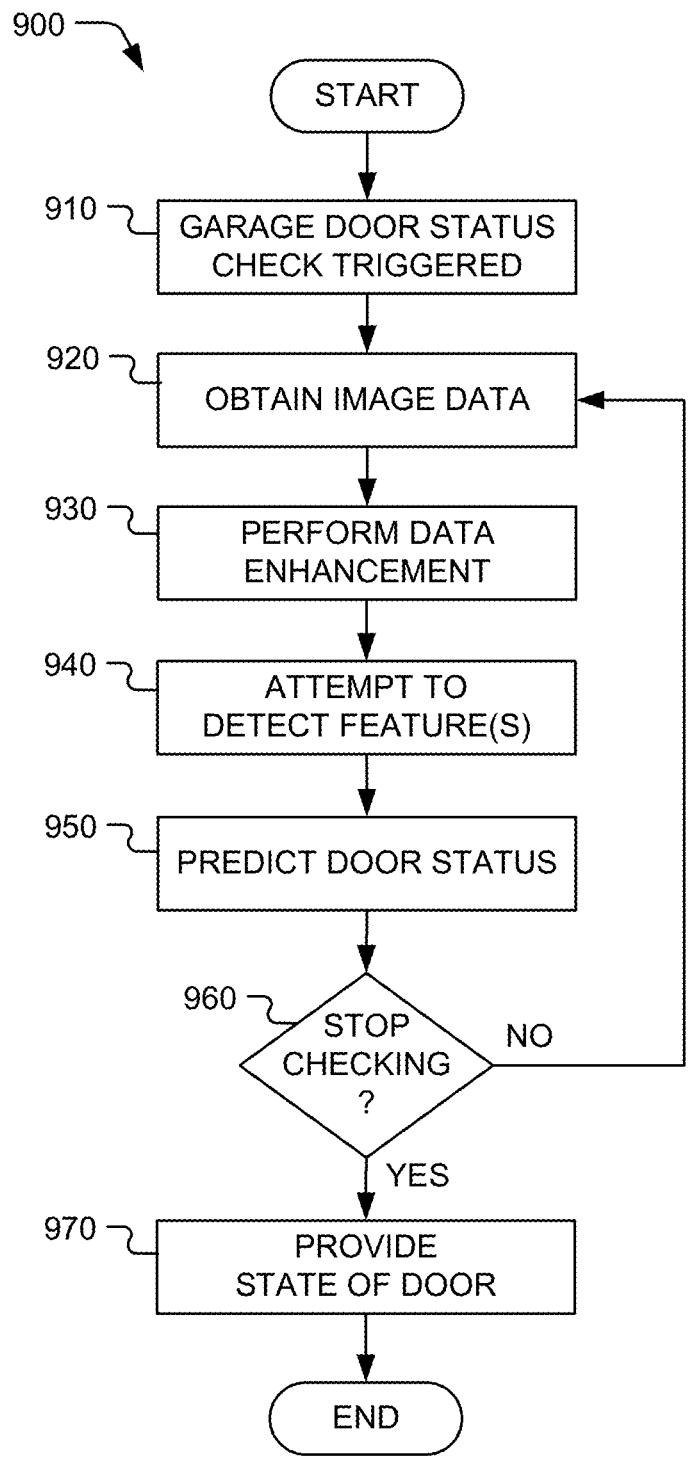
FIG. 9 is a flow diagram of a method of determining the state of the door.

FIG. 9 is a method 900 of determining the state of the door 108. The method 900 may be performed in block 530 (see FIG. 5). Portions of the method 900 will be described as being performed by the instructions 212 but such portions may alternatively or additionally be performed by the instructions 232.

In first block 910, a status check is triggered. For example, the status check may be triggered by the block 530 (see FIG. 5). By way of additional non-limiting examples, referring to FIG. 3, the status check may be triggered when motion is detected by the instructions 212 and/or the instructions 232, the door 108 is operated (e.g., opened or closed), the user 146 (see FIGS. 1, 2, and 6) requests the state of the door 108, a rule in the instructions 212 request that the status check be performed, a rule in the instructions 232 request that the status check be performed, and the like.

Then, in block 920 (see FIG. 9), the instructions 212 obtain image data captured by the first image capture device 102A and/or the second image capture device 102B. In block 930 (see FIG. 9), the instructions 212 may perform at least one image enhancing operation on the image data obtained in block 920 to obtain enhanced image data. For example, the image enhancing operation(s) performed may include histogram equalization, image binarization, and the like. However, in some embodiments, block 930 may be omitted. In block 940 (see FIG. 9), the instructions 212 attempt to detect the feature(s) 110 in the image data (that may have been enhanced in block 930, when present) and, when the feature(s) 110 is/are detected, determine the location of the detected feature(s). The instructions 212 may perform one or more feature detection operation to attempt to detect the feature(s) 110 in the image data (that may have been enhanced in block 930, when present).

In block 950 (see FIG. 9), the instructions 212 predict the status of the door 108 based on the results of block 940 and, when the feature(s) 110 was/were detected, the location(s) of the feature(s) 110 identified by the user 146 in block 420 (see FIG. 4) and/or optional block 440 (see FIG. 4). For example, the results of block 940 may include the location of the detected feature(s) within the image data (that may have been enhanced in block 930, when present). The model 219D may use the results of block 940 as input and output the state of the door as a predicted status. The model 219D may also use a current door state stored in a current state cache 219B as an input and base the predicted status at least in part on the current door state. The predicted status may be stored in a door state cache 219C in the memory 210.

Next, in decision block 960 (see FIG. 9), the instructions 212 decide whether to continue the status check by analyzing additional image data or terminate the status check. By way of non-limiting examples, the instructions 212 may decide to terminate the status check when confidence in the prediction is high, the state is cross validated across different timeframes (e.g., in different images captured a different times), a predetermined number of checking attempts have been performed, and the like. The decision in decision block 960 is "YES," when the instructions 212 decide to terminate the status check. Otherwise, the decision in decision block 960 is "NO."

When the decision in decision block 960 is "NO," the instructions 212 return to block 920 (see FIG. 9). On the other hand, when the decision in decision block 960 is "YES," in block 970 (see FIG. 9), the instructions 212 provide the state of the door 108 and store the state of the door 108 in the current state cache 219B. The instructions 212 may obtain the state of the door 108 from the door state cache 219C. For example, the instructions 212 may use the most recent predicted status stored in the door state cache 219C as the state or may use a mathematical or statistical method to obtain the state based a predetermined number of the most recently obtained predicted statuses. Then, the method 900 (see FIG. 9) terminates. The method 900 may be characterized as determining the state (open or closed) of the door 108 and not its position.

As mentioned above, portions of the method 900 may be performed by the instructions 232. In such embodiments, in block 930 (see FIG. 9), the instructions 232 may perform the image enhancing operation(s) on the image data obtained in block 920. In block 940 (see FIG. 9), the instructions 232 may attempt to detect the feature(s) 110 in the image data (that may have been enhanced in block 930, when present) and, when the feature(s) 110 is/are detected, determine the location of the detected feature(s). Then, in block 950 (see FIG. 9), the instructions 232 may predict the status of the door 108. For example, the model 234D may use the results of block 940 as input and output the state of the door as a predicted status. The model 234D may also use a current door state stored in a current state cache 234B as an input and base the predicted status at least in part on the current door state. The predicted status may be stored in a door state cache 234C in the memory 210. In decision block 960 (see FIG. 9), the instructions 232 may decide whether to continue the status check by analyzing additional image data or terminate the status check. When the decision in decision block 960 is "NO," the instructions 232 may return to block 920 (see FIG. 9). On the other hand, when the decision in decision block 960 is "YES," in block 970 (see FIG. 9), the instructions 232 may provide the state of the door 108 and store the state of the door 108 in the current state cache 2346. The instructions 232 may obtain the state of the door 108 from the door state cache 234C. For example, the instructions 232 may use the most recent predicted status stored in the door state cache 234C as the state or may use a mathematical or statistical method to obtain the state based a predetermined number of the most recently obtained predicted statuses.

Referring to FIG. 1, the first image capture device 102A and the marker 111 displaying the feature(s) 110 may be packaged and sold together in a first kit. The first kit may optionally include the door controller 104, the connection 117, the connection 118, the second image capture device 102B, and/or the connection 617. In another embodiment, the first image capture device 102A and the door controller 104 may be packaged and sold together in a second kit. The second kit may optionally include the marker 111 displaying the feature(s) 110, the connection 117, the connection 118, the second image capture device 102B, and/or the connection 617.

The client application 144 may be downloaded from the computing device(s) 152 and/or the third-party computing device(s) 160 over the network 130 and may automatically discover the image capture device(s) 102 over the network 130. For example, the first kit and/or the second kit may include instructions for connecting the client application 144 to the image capture device(s) 102 and establishing communication therebetween.

Mobile Communication Device

Figure 10:
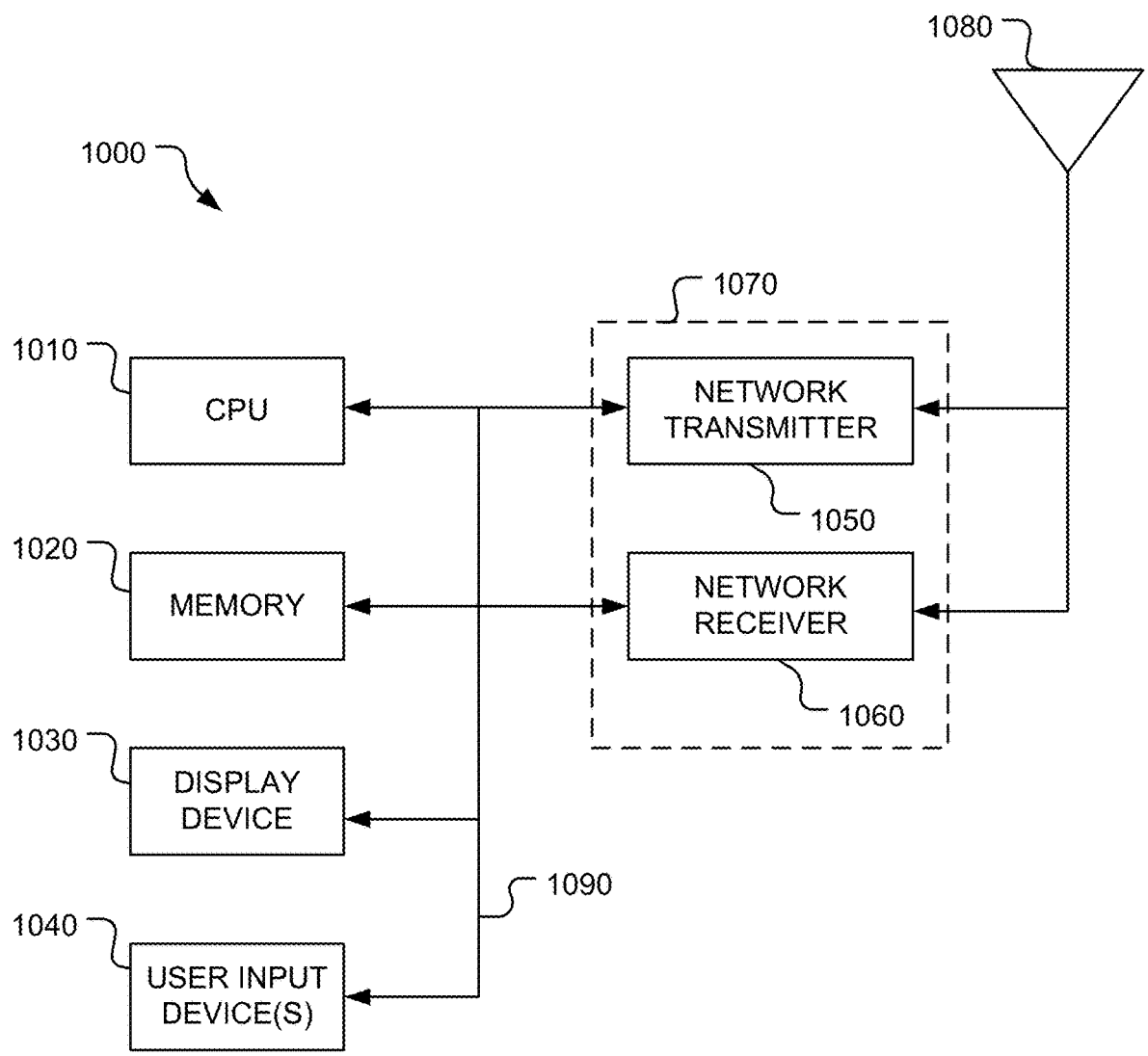
FIG. 10 is a functional block diagram illustrating a mobile communication device that may be used to implement at least one client computing device of FIG. 1.

FIG. 10 is a functional block diagram illustrating the mobile communication device 1000 that may be used to implement the client computing device 140 of FIGS. 1, 2, and 6. By way of non-limiting examples, referring to FIG. 10, the mobile communication device 1000 may be implemented as a cellular telephone, a tablet computer, and the like. The mobile communication device 1000 includes a central processing unit ("CPU") 1010. Those skilled in the art will appreciate that the CPU 1010 may be implemented as a conventional microprocessor, application specific integrated circuit ("ASIC"), digital signal processor ("DSP"), programmable gate array ("PGA"), or the like. The mobile communication device 1000 is not limited by the specific form of the CPU 1010.

The mobile communication device 1000 also contains the memory 1020. The memory 1020 may store instructions and data to control operation of the CPU 1010. The memory 1020 may include random access memory, read-only memory, programmable memory, flash memory, and the like. The mobile communication device 1000 is not limited by any specific form of hardware used to implement the memory 1020. The memory 1020 may also be integrally formed in whole or in part with the CPU 1010.

The mobile communication device 1000 also includes conventional components, such as the display device 1030 and one or more user input devices 1040 (e.g., buttons, a keypad, a keyboard, and the like). These are conventional components that operate in a known manner and need not be described in greater detail. The display device 1030 may be implemented as a touch display or touchscreen configured to receive user input. For example, referring to FIG. 6, the display device 1030 (see FIG. 10) may receive information from the user 146 indicating that the feature(s) 110 have been positioned on the door 108, indicating that the door 108 is in the closed state, indicating that the door 108 is in the open state, including one or more identifications each of a position of the feature(s) 110 in one or more of images of the door 108, including information marking selected position(s) identifying the feature(s) 110 as corresponding to the closed state for the door 108, including information marking selected position(s) identifying the feature(s) 110 as corresponding to the open state for the door 108, indicating that the user 146 would like to reposition the door 108, identifying a desired state of the door 108, and including identifications of an object in one or more images. The display device 1030 (see FIG. 10) may display and receive user input from the graphical user interface (not shown) of the client application 144. The display device 1030 may display images captured by the first image capture device 102A and/or the second image capture device 102B. The display device 148 may each be implemented as the display device 1030.

Referring to FIG. 10, the mobile communication device 1000 also includes a network transmitter 1050 such as may be used by the mobile communication device 1000 for normal network wireless communication with the network 130 (see FIGS. 1-3, 6, and 7), such as with a base station (not shown) of a cellular network. FIG. 10 also illustrates a network receiver 1060 that operates in conjunction with the network transmitter 1050 to communicate with the network 130 (see FIGS. 1-3, 6, and 7), such as with the base station (not shown) of the cellular network. In a typical embodiment, the network transmitter 1050 and network receiver 1060 are implemented as a network transceiver 1070. The network transceiver 1070 is connected to an antenna 1080. Operation of the network transceiver 1070 and the antenna 1080 for communication with the network 130 (see FIGS. 1-3, 6, and 7) is well-known in the art and need not be described in greater detail herein.

Returning to FIG. 10, other conventional components found in wireless communication devices, such as a USB interface, Bluetooth interface, camera/video device, infrared device, global positioning system ("GPS") device, and the like, may also be included in the mobile communication device 1000. For the sake of clarity, these conventional elements are not illustrated in the functional block diagram of FIG. 10. The GPS device may be used to determine the current geographic location (e.g., latitude and longitude) of the mobile communication device 1000.

The various components illustrated in FIG. 10 are coupled together by a bus system 1090. The bus system 1090 may include an address bus, data bus, power bus, control bus, and the like. For the sake of convenience, the various busses in FIG. 10 are illustrated as the bus system 1090.

In some embodiments, the memory 1020 stores computer executable instructions that when executed by one or more processors (e.g., the CPU 1010) cause the one or more processors to implement the client application 144 and/or perform all or portions of one or more of the methods (including the methods 400, 500, 800, and 900 illustrated in FIGS. 4, 5, 8, and 9, respectively) described above. Such instructions may be stored on one or more non-transitory computer-readable media.

Computing Device

Figure 11:
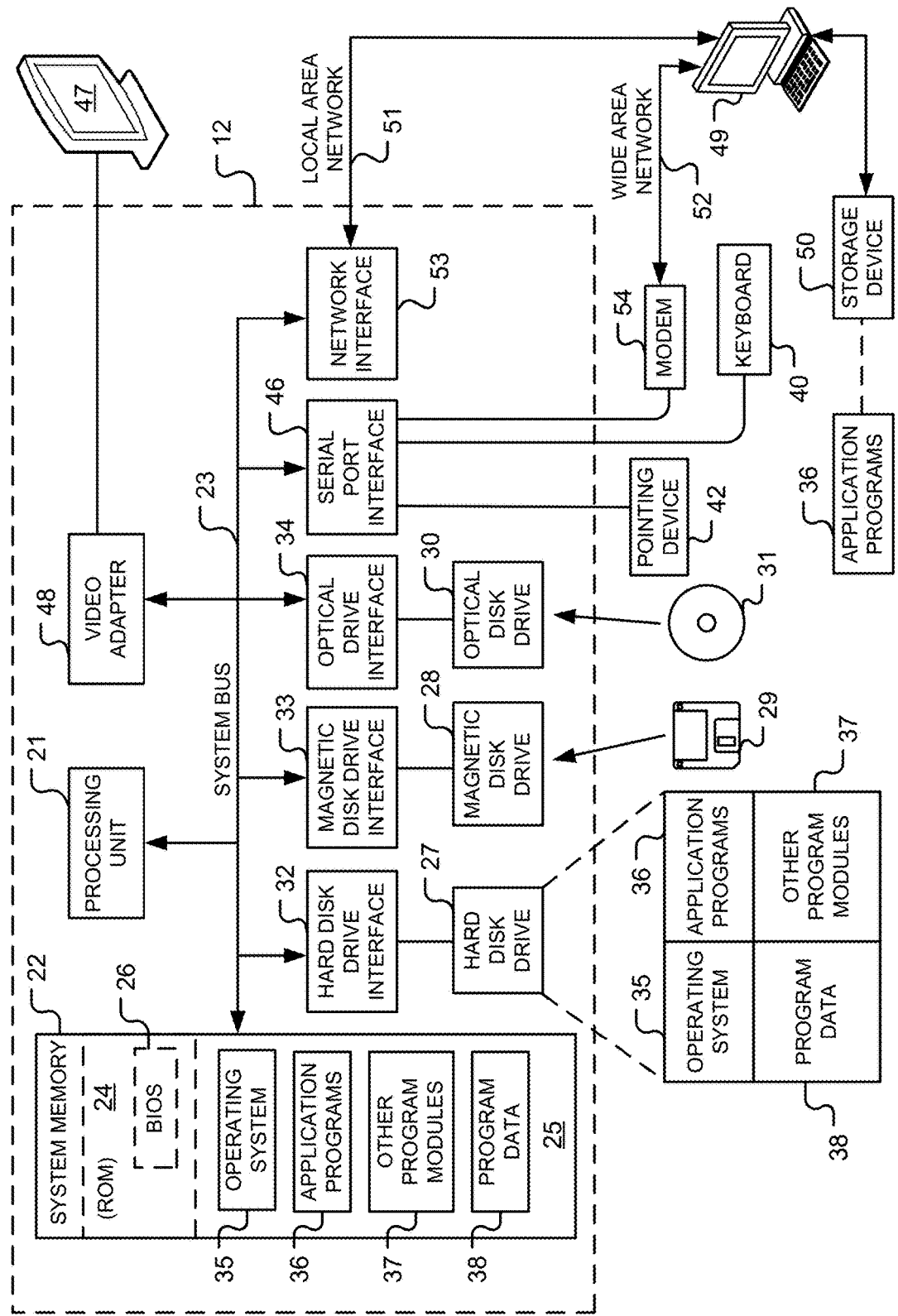
FIG. 11 is a diagram of a hardware environment and an operating environment in which computing devices of the computer vision-based system of FIG. 1 may be implemented.

FIG. 11 is a diagram of hardware and an operating environment in conjunction with which implementations of the one or more computing devices of the system 100 (see FIGS. 1, 2, and 6) may be practiced (e.g., the client computing device 140, the computing device(s) 152, and/or the third-party computing device(s) 160). The description of FIG. 11 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network. In a distributed computing environment, program modules may be located in both local and remote memory storage devices.

The exemplary hardware and operating environment of FIG. 11 includes a general-purpose computing device in the form of the computing device 12. Each of the computing devices of FIG. 1 (including the client computing device 140, the computing device(s) 152, and/or the third-party computing device(s) 160) may be substantially identical to the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random-access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feed back game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 11 include a local-area network (LAN) 51 and a wide-area network (WAN) 52. Such networking environments are commonplace in offices, enterprise-wide computer networks, intranets and the Internet. The network 130 (see FIGS. 1-3, 6, and 7) may be implemented using one or more of the LAN 51 or the WAN 52 (e.g., the Internet).

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to implement an application (e.g., the client application 144, the server application 150, and/or the third-party application 164) and/or perform all or portions of one or more of the methods (including the methods 400, 500, 800, and 900 illustrated in FIGS. 4, 5, 8, and 9, respectively) described above. Such instructions may be stored on one or more non-transitory computer-readable media.

At least one embodiment of the disclosure can be described in view of the following clauses:

1. An image capture device for use with a door comprising at least one predefined feature, the image capture device comprising: at least one image sensor positionable to observe the at least one predefined feature when the door is in a closed position; a network interface to communicate with a computing device over a network; at least one processor; and memory comprising instructions to be executed by the at least one processor, the instructions when executed by the at least one processor causing the at least one processor to detect when the at least one predefined feature has moved, determine whether the door is in a closed state, and send a notification over the network interface to the computing device when the door is determined not to be in the closed state.
2. The image capture device of clause 1, wherein the at least one predefined feature comprises a marker affixed to the door.
3. The image capture device of clause 2, wherein the marker comprises a Quick Response ("QR") code.
4. The image capture device of clause 3, wherein the marker comprises a sheet of material with the QR code printed thereupon.
5. The image capture device of any one of clauses 1-4 for use with a door controller connected to a door motor that is tethered to the door, wherein the door is a garage door and the instructions when executed by the at least one processor, cause the at least one processor to: receive at least one first instruction from the computing device to close the garage door when the garage door is not in the closed state, and send at least one second instruction to the door controller, the at least one second instruction causes the door controller to send at least one third instruction to the door motor, the at least one third instruction causes the door motor to close the garage door.
6. The image capture device of any one of clauses 1-5, wherein the at least one image sensor is to capture images, and the instructions, when executed by the at least one processor, cause the at least one processor to: receive an identification of the at least one predefined feature within an image captured by the at least one image sensor when the door is closed, train a model using the identification and the image as training data, receive a new image captured by the at least one image sensor, and use the model to determine whether the door is in the closed state based at least in part on the new image.
7. The image capture device of clause 6, wherein the instructions, when executed by the at least one processor, cause the at least one processor to: attempt to detect the at least one predefined feature in the new image before using the model to determine whether the door is in the closed state.
8. The image capture device of clause 7, wherein the instructions, when executed by the at least one processor, cause the at least one processor to: enhance the new image before attempting to detect the at least one predefined feature in the new image.
9. The image capture device of any one of clauses 1-8, further comprising: at least one sound sensor, the instructions when executed by the at least one processor causing the at least one processor to detect when the at least one predefined feature has moved based at least in part on sound data recorded by the at least one sound sensor.
10. The image capture device of any one of clauses 1-9, further comprising: at least one motion sensor, the instructions when executed by the at least one processor causing the at least one processor to detect when the at least one predefined feature has moved based at least in part on motion detected by the at least one motion sensor.
11. A computer vision-based system for use with a door motor for opening and closing a door, the door being in a closed state when the door is in a closed position, the computer vision-based system comprising: a door controller; and an image capture device connectable to the door controller, the image capture device to capture images, use at least one of the images to detect when an object has approached the door, determine whether the object is an approved object, and send at least one first instruction to the door controller when the object is determined to be the approved object, the door controller to send at least one second instruction to the door motor after receiving the at least one first instruction, the at least one second instruction causing the door motor to open the door.
12. The computer vision-based system of clause 11, wherein the image capture device is to track the object as the object passes through an opening exposed when the door is opened, and send at least one third instruction to the door controller when the object has passed completely through the opening, and the door controller is to send at least one fourth instruction to the door motor after receiving the at least one third instruction, the at least one fourth instruction causing the door motor to close the door.

13. The computer vision-based system of clause 12, wherein the door is a garage door, and the object is a vehicle.

14. The computer vision-based system of any one of clauses 11-13, wherein the image capture device is a first image capture device and the computer vision-based system further comprises: (a) a second image capture device to track the object as the object passes through an opening exposed when the door is open, detect when an obstruction is present within the opening, and send at least one third instruction to the door controller when the object has passed completely through the opening and the second image capture device has determined that the opening is free of obstructions that would interfere with closing the door, and (b) the door controller is to send at least one fourth instruction to the door motor after receiving the at least one third instruction, the at least one fourth instruction causing the door motor to close the door.

15. The computer vision-based system of clause 14, wherein at least one receiving image capture device of the first or second image capture devices is to receive images from an onboard image capture device of the object, and the receiving image capture device is to track the object as the object passes through the opening using one or more of the images captured by the onboard image capture device.

16. The computer vision-based system of clause 14 or 15, wherein the door is a garage door, and the object is a vehicle.

17. The computer vision-based system of any one of clauses 11-16 for use with the door comprising at least one feature, wherein the image capture device is a first image capture device and the computer vision-based system further comprises: a second image capture device to detect when the at least one feature has moved and send a notification over a network interface to a computing device when the door is not closed.

18. The computer vision-based system of any one of clauses 11-17, further comprising: a marker affixed to the door, the image capture device being a first image capture device; and a second image capture device to detect when the marker has moved, determine whether a position of the marker indicates the door is in a closed state, and send a notification over a network interface to a computing device when the second image capture device determines the door is not in the closed state.

19. The computer vision-based system of clause 18, wherein the marker comprises a Quick Response ("QR") code.

20. The computer vision-based system of clause 18 or 19, wherein the image capture device detects light within both a set of visible wavelengths and a set of infrared wavelengths, and the marker includes a visible portion detectable within the set of visible wavelengths and an infrared portion detectable within the set of infrared wavelengths.

21. The computer vision-based system of any one of clauses 11-20 for use with a network, the computer vision-based system further comprising: a computing device connectable to the network, the image capturing device being connectable to the computing device over the network, the computing device being operable to send at least one third instruction to the image capturing device indicating the door is to be moved, the image capturing device to send at least one fourth instruction to the door controller based at least in part on the at least one third instruction, the door controller to send at least one fifth instruction to the door motor after receiving the at least one fourth instruction, the at least one fifth instruction causing the door motor to move the door.

22. A kit comprising: a marker to be affixed to a door; and a first image capture device to capture at least one image of the marker when the door is in a closed position, detect when the marker has moved, and send a notification to a computing device when the door is determined not to be in a closed state.

23. The kit of clause 22, further comprising: a door controller connected to a door motor that is tethered to the door; and a second image capture device connectable to the door controller, the second image capture device to capture images, use at least one of the images to detect when an object has approached the door, determine whether the object is an approved object, and send at least one first instruction to the door controller when the object is determined to be the approved object, the door controller to send at least one second instruction to the door motor after receiving the at least one first instruction, the at least one second instruction causing the door motor to open the door.

24. The kit of clause 23, wherein the second image capture device is to receive at least one third instruction from the computing device to close the door when the door is not in the closed state, and send at least one fourth instruction to the door controller, the at least one fourth instruction causing the door controller to send at least one fifth instruction to the door motor, the at least one fifth instruction causing the door motor to close the door.

25. The kit of any one of clauses 22-24, further comprising: a door controller connected to a door motor that is tethered to the door, the first image capture device to receive at least one first instruction from the computing device to close the door when the door is not in the closed state, and send at least one second instruction to the door controller, the at least one second instruction causing the door controller to send at least one third instruction to the door motor, the at least one third instruction causing the door motor to close the door.

26. A method comprising: monitoring, by an image capture device, a region comprising a door; detecting, by the image capture device, when at least one feature of the door has moved; determining, by the image capture device, whether the door is in a closed state; and sending a notification, by the image capture device, to a computing device when the door is determined not to be in the closed state.

27. The method of clause 26, further comprising: placing a marker comprising the at least one feature on the door.

28. The method of clause 27, further comprising: before the image capture device detects the at least one feature has moved, identifying a location of the marker when the door is in the closed state in an image captured by the image capture device, the image capture device using the location to determine whether the door is in the closed state.

29. The method of any one of clauses 26-28, further comprising: identifying the at least one feature using a machine learning method.

30. The method of any one of clauses 26-29, further comprising: receiving, by the image capture device, at least one first instruction from the computing device after sending the notification; sending, by the image capture device, at least one second instruction to a door controller; sending, by the door controller, at least one third instruction to a door motor after the door controller receives the at least one second instruction; and closing, by the door motor, the door after the door motor receives the at least one third instruction.

31. A method comprising: capturing images, by an image capture device, of an approach region adjacent to a door; using, by the image capture device, at least one of the images to detect when an object has approached the door; determining, by the image capture device, whether the object is an approved object; sending, by the image capture device, at least one first instruction to a door controller when the object is determined to be the approved object; sending, by the door controller, at least one second instruction to a door motor after receiving the at least one first instruction; and opening, by the door motor, the door after the door motor receives the at least one second instruction.

32. The method of clause 31, wherein the image capture device is a first image capture device and the method further comprises: tracking, by a second image capture device, the object as the object passes through an opening exposed when the door is opened; sending, by the second image capture device, at least one third instruction to the door controller when the object has passed completely through the opening; sending, by the door controller, at least one fourth instruction to the door motor after receiving the at least one third instruction; and closing, by the door motor, the door after the door motor receives the at least one fourth instruction.

33. The method of clause 31 or 32, wherein the image capture device is a first image capture device and the method further comprises: detecting, by a second image capture device, when an obstruction is present within an opening exposed when the door is open; tracking, by the second image capture device, the object as the object passes through the opening; sending, by the second image capture device, at least one third instruction to the door controller when the object has passed completely through the opening and the second image capture device determines the opening is free of obstructions that would interfere with closing the door; sending, by the door controller, at least one fourth instruction to the door motor after receiving the at least one third instruction; and closing, by the door motor, the door after the door motor receives the at least one fourth instruction.

34. The method of any one of clauses 31-33, wherein the door comprises at least one feature, the image capture device is a first image capture device, and the method further comprises: detecting, by a second image capture device, when the at least one feature has moved; and sending, by the second image capture device, a notification over a network interface to a computing device when the door is not closed.

35. The method of any one of clauses 31-34, further comprising: using one or more images captured by an onboard image capture device of the object to track the object as the object passes through an opening exposed when the door is opened; and causing the door to close when the object has passed completely through the opening and the opening is free of obstructions that would interfere with closing the door.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

As used herein, a term joining items in a series (e.g., the term "or," the term "and," or the like) does not apply to the entire series of items, unless specifically stated otherwise or otherwise clearly contradicted by context. For example, the phrase "a plurality of A, B, and C" (with or without the Oxford comma) refers to a subset including at least two of the recited items in the series. Thus, the phrase refers to (1) at least one A and at least one B but not C, (2) at least one A and at least one C but not B, (3) at least one B and at least one C but not A, and (4) at least one A and at least one B and at least one C. Similarly, the phrase "a plurality of A, B, or C" (with or without the Oxford comma) refers to a subset including at least two of the recited items in the series. Thus, this phrase also refers to (1) at least one A and at least one B but not C, (2) at least one A and at least one C but not B, (3) at least one B and at least one C but not A, and (4) at least one A and at least one B and at least one C.

By away of another example, Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. An image capture device for use with a door comprising at least one predefined feature, the image capture device comprising:
   at least one image sensor to capture images of the at least one predefined feature;
   a network interface to communicate with a computing device over a network;
   at least one processor; and
   memory comprising instructions to be executed by the at least one processor, the instructions when executed by the at least one processor causing the at least one processor to receive, from a user, an identification marking a location of the at least one predefined feature within at least one first image of the images captured by the at least one image sensor when the door is closed, train at least one machine learning process using the identification marking the location and the at least one first image as training data, use at least one second image to detect when the at least one predefined feature has moved, cause the trained at least one machine learning process to predict whether the door is in a closed state after detecting the at least one predefined feature has moved, and send a notification over the network interface to the computing device if the door is not predicted to be in the closed state.

2. The image capture device of claim 1, wherein the at least one predefined feature comprises a marker affixed to the door.

3. The image capture device of claim 2, wherein the marker comprises a Quick Response ("QR") code.

4. The image capture device of claim 3, wherein the marker comprises a sheet of material with the QR code printed thereupon.

5. The image capture device of claim 1 for use with a door controller connected to a door motor that is tethered to the door, wherein the door is a garage door and the instructions when executed by the at least one processor, cause the at least one processor to:
   receive at least one first instruction from the computing device to close the garage door when the garage door is not in the closed state, and
   send at least one second instruction to the door controller, the at least one second instruction causes the door controller to send at least one third instruction to the door motor, the at least one third instruction causes the door motor to close the garage door.

6. The image capture device of claim 1, wherein the door is a garage door and the at least one predefined feature is affixed to the garage door.

7. The image capture device of claim 6, wherein the instructions, when executed by the at least one processor, cause the at least one processor to provide the at least one first image to a client computing device operated by the user, and
   the identification marking the location is received from the client computing device, which is used by the user to mark the location of the at least one predefined feature within the at least one first image.

8. The image capture device of claim 1, further comprising:
   at least one motion sensor, the instructions when executed by the at least one processor causing the at least one processor to detect when the at least one predefined feature has moved based at least in part on motion detected by the at least one motion sensor.

9. The image capture device of claim 1, wherein the at least one machine learning process is trained using a set of labeled data.

10. A kit comprising:
    a marker to be affixed to a door; and
    a first image capture device to capture images of the marker, receive, from a user device, an identification labeling a portion of at least one first image of the images when the door is closed as including the marker, train at least one machine learning process using the identification labeling the portion and the at least one first image as training data, use at least one second image to detect when the marker has moved, cause the trained at least one machine learning process to predict whether the door is in a closed state after detecting the marker has moved, and send a notification to a computing device when the door is not predicted to be in the closed state.

11. The kit of claim 10, further comprising:
    a door controller connected to a door motor that is tethered to the door; and
    a second image capture device connectable to the door controller, the second image capture device to capture a plurality of images, use at least one of the plurality of images to detect when an object has approached the door, determine whether the object is an approved object, and send at least one first instruction to the door controller when the object is determined to be the approved object, the door controller to send at least one second instruction to the door motor after receiving the at least one first instruction, the at least one second instruction causing the door motor to open the door.

12. The kit of claim 11, wherein the second image capture device is to receive at least one third instruction from the computing device to close the door when the door is not in the closed state, and send at least one fourth instruction to the door controller, the at least one fourth instruction causing the door controller to send at least one fifth instruction to the door motor, the at least one fifth instruction causing the door motor to close the door.

13. The kit of claim 10, further comprising:
a door controller connected to a door motor that is tethered to the door, the first image capture device to receive at least one first instruction from the computing device to close the door when the door is not in the closed state, and send at least one second instruction to the door controller, the at least one second instruction causing the door controller to send at least one third instruction to the door motor, the at least one third instruction causing the door motor to close the door.

14. A method comprising:
capturing images, by an image capture device, of a region comprising a door;
receiving, from a device operated by a user, an identification marking a location of at least one predefined feature within at least one first image of the images when the door is closed;
training at least one machine learning process using the identification marking the location and the at least one first image as training data;
using, by the image capture device, at least one second image to detect when the door has moved;
causing, by the image capture device, at least one machine learning process to predict whether the door is in a closed state after detecting the at least one predefined feature has moved; and
sending a notification, by the image capture device, to a computing device when the door is determined not to be in the closed state.

15. The method of claim 14, further comprising:
placing a marker on the door.

16. The method of claim 14, further comprising:
receiving, by the image capture device, at least one first instruction from the computing device after sending the notification;
sending, by the image capture device, at least one second instruction to a door controller;
sending, by the door controller, at least one third instruction to a door motor after the door controller receives the at least one second instruction; and
closing, by the door motor, the door after the door motor receives the at least one third instruction.

17. The method of claim 14, further comprising:
using supervised learning to train the at least one machine learning process.

* * * * *